(12) United States Patent
 Siminoff

(10) Patent No.: US 11,381,784 B1
(45) Date of Patent: Jul. 5, 2022

(54) MONITORING AND LOCATING TRACKED OBJECTS USING AUDIO/VIDEO RECORDING AND COMMUNICATION DEVICES

(71) Applicant: Amazon Technologies, Inc., Seattle, WA (US)

(72) Inventor: James Siminoff, Pacific Palisades, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/114,422

(22) Filed: Aug. 28, 2018

Related U.S. Application Data

(60) Provisional application No. 62/550,976, filed on Aug. 28, 2017.

(51) Int. Cl.
| | |
|---|---|
| *G06K 19/07* | (2006.01) |
| *G06K 7/10* | (2006.01) |
| *G08B 13/24* | (2006.01) |
| *G08B 21/02* | (2006.01) |
| *G08B 21/24* | (2006.01) |
| *H04M 1/72* | (2021.01) |
| *H04W 4/02* | (2018.01) |
| *H04N 7/18* | (2006.01) |
| *G06T 7/246* | (2017.01) |

(Continued)

(52) U.S. Cl.
CPC .............. *H04N 7/186* (2013.01); *G06T 7/246* (2017.01); *H04M 1/0291* (2013.01); *H04M 11/025* (2013.01)

(58) Field of Classification Search
None
See application file for complete search history.

(56) References Cited

U.S. PATENT DOCUMENTS

| | | | |
|---|---|---|---|
| 4,764,953 | A | 8/1988 | Chern et al. |
| 5,428,388 | A | 6/1995 | von Bauer et al. |
| 5,760,848 | A | 6/1998 | Cho |

(Continued)

FOREIGN PATENT DOCUMENTS

| | | |
|---|---|---|
| CN | 2585521 Y | 11/2003 |
| CN | 2792061 Y | 6/2006 |

(Continued)

*Primary Examiner* — Patricia I Young
(74) *Attorney, Agent, or Firm* — Lee & Hayes, P.C.

(57) ABSTRACT

Monitoring and locating tracked objects using audio/video (A/V) recording and communication devices in accordance with various embodiments of the present disclosure are provided. In one embodiment, a method for monitoring an object using a smart-home hub device in network communication with A/V recording and communication devices is provided, the method comprising: associating a tag having tag data compatible for use in a low-power wide-area network (LPWAN) with at least one tracked object to be located when missing; activating the smart-home hub device to monitor the at least one tracked object on a premises by listening for the tag data transmitted by the tag; determining when the at least one tracked object has been removed from the premises using the tag data; and transmitting to a first client device, an alert upon a determination that the at least one tracked object has been removed from the premises.

24 Claims, 23 Drawing Sheets

(51) Int. Cl.
*H04M 11/02* (2006.01)
*H04M 1/02* (2006.01)

(56) References Cited

U.S. PATENT DOCUMENTS

| | | | |
|---|---|---|---|
| 6,072,402 A | 6/2000 | Kniffin et al. |
| 6,192,257 B1 | 2/2001 | Ray |
| 6,271,752 B1 | 8/2001 | Vaios |
| 6,429,893 B1 | 8/2002 | Xin |
| 6,456,322 B1 | 9/2002 | Marinacci |
| 6,476,858 B1 | 11/2002 | Ramirez Diaz et al. |
| 6,633,231 B1 | 10/2003 | Okamoto et al. |
| 6,658,091 B1 | 12/2003 | Naidoo et al. |
| 6,753,774 B2 | 6/2004 | Pan et al. |
| 6,970,183 B1 | 11/2005 | Monroe |
| 7,062,291 B2 | 6/2006 | Ryley et al. |
| 7,065,196 B2 | 6/2006 | Lee |
| 7,085,361 B2 | 8/2006 | Thomas |
| 7,109,860 B2 | 9/2006 | Wang |
| 7,193,644 B2 | 3/2007 | Carter |
| 7,304,572 B2 | 12/2007 | Sheynman et al. |
| 7,382,249 B2 | 6/2008 | Fancella |
| 7,450,638 B2 | 11/2008 | Iwamura |
| 7,643,056 B2 | 1/2010 | Silsby |
| 7,683,924 B2 | 3/2010 | Oh et al. |
| 7,683,929 B2 | 3/2010 | Elazar et al. |
| 7,738,917 B2 | 6/2010 | Ryley et al. |
| 8,139,098 B2 | 3/2012 | Carter |
| 8,144,183 B2 | 3/2012 | Carter |
| 8,154,581 B2 | 4/2012 | Carter |
| 8,619,136 B2 | 12/2013 | Howarter et al. |
| 8,872,915 B1 | 5/2014 | Scalisi et al. |
| 8,780,201 B1 | 7/2014 | Scalisi et al. |
| 8,823,795 B1 | 9/2014 | Scalisi et al. |
| 8,842,180 B1 | 9/2014 | Kasmir et al. |
| 8,937,659 B1 | 1/2015 | Scalisi et al. |
| 8,941,736 B1 | 1/2015 | Scalisi |
| 8,947,530 B1 | 2/2015 | Scalisi |
| 8,953,040 B1 | 2/2015 | Scalisi et al. |
| 9,013,575 B2 | 4/2015 | Scalisi |
| 9,036,028 B2* | 5/2015 | Buehler .............. G08B 13/248 348/159 |
| 9,049,352 B2 | 6/2015 | Scalisi et al. |
| 9,053,622 B2 | 6/2015 | Scalisi |
| 9,058,738 B1 | 6/2015 | Scalisi |
| 9,060,103 B2 | 6/2015 | Scalisi |
| 9,060,104 B2 | 6/2015 | Scalisi |
| 9,065,987 B2 | 6/2015 | Scalisi |
| 9,094,584 B2 | 7/2015 | Scalisi et al. |
| 9,113,051 B1 | 8/2015 | Scalisi |
| 9,113,052 B1 | 8/2015 | Scalisi et al. |
| 9,118,819 B1 | 8/2015 | Scalisi et al. |
| 9,142,214 B2 | 9/2015 | Scalisi |
| 9,160,987 B1 | 10/2015 | Kasmir et al. |
| 9,165,444 B2 | 10/2015 | Scalisi |
| 9,172,920 B1 | 10/2015 | Kasmir et al. |
| 9,172,921 B1 | 10/2015 | Scalisi et al. |
| 9,172,922 B1 | 10/2015 | Kasmir et al. |
| 9,179,107 B1 | 11/2015 | Scalisi |
| 9,179,108 B1 | 11/2015 | Scalisi |
| 9,179,109 B1 | 11/2015 | Kasmir et al. |
| 9,196,133 B2 | 11/2015 | Scalisi et al. |
| 9,197,867 B1 | 11/2015 | Scalisi et al. |
| 9,230,424 B1* | 1/2016 | Scalisi ................ H04L 12/2818 |
| 9,237,318 B2 | 1/2016 | Kasmir et al. |
| 9,247,219 B2 | 1/2016 | Kasmir et al. |
| 9,253,455 B1 | 2/2016 | Harrison et al. |
| 9,342,936 B2 | 5/2016 | Scalisi |
| 9,508,239 B1* | 11/2016 | Harrison ................ G08B 3/10 |
| 9,736,284 B2 | 8/2017 | Scalisi et al. |
| 9,743,049 B2 | 8/2017 | Scalisi et al. |
| 9,769,435 B2 | 9/2017 | Scalisi et al. |
| 9,786,133 B2 | 10/2017 | Harrison et al. |
| 9,799,183 B2 | 10/2017 | Harrison et al. |
| 10,628,725 B1* | 4/2020 | Mei .................. G06K 19/0724 |
| 2002/0094111 A1 | 7/2002 | Puchek et al. |
| 2002/0147982 A1 | 10/2002 | Naidoo et al. |
| 2003/0043047 A1 | 3/2003 | Braun |
| 2004/0085205 A1 | 5/2004 | Yeh |
| 2004/0085450 A1 | 5/2004 | Stuart |
| 2004/0086093 A1 | 5/2004 | Schranz |
| 2004/0095254 A1 | 5/2004 | Maruszczak |
| 2004/0135686 A1 | 7/2004 | Parker |
| 2004/0160317 A1* | 8/2004 | McKeown ........ G08B 13/2462 340/522 |
| 2004/0164858 A1* | 8/2004 | Lin .................... G06K 9/00771 340/522 |
| 2005/0111660 A1 | 5/2005 | Hosoda |
| 2006/0010199 A1 | 1/2006 | Brailean et al. |
| 2006/0022816 A1 | 2/2006 | Yukawa |
| 2006/0139449 A1 | 6/2006 | Cheng et al. |
| 2006/0156361 A1 | 7/2006 | Wang et al. |
| 2007/0008081 A1 | 1/2007 | Tylicki et al. |
| 2007/0109416 A1* | 5/2007 | Lortie ................ H04N 5/23203 348/211.14 |
| 2010/0019905 A1* | 1/2010 | Boddie ................ G06Q 10/087 340/572.1 |
| 2010/0225455 A1 | 9/2010 | Claiborne et al. |
| 2011/0069173 A1* | 3/2011 | Hazzani ........... H04N 21/21805 348/159 |
| 2013/0057695 A1 | 3/2013 | Huisking |
| 2013/0141233 A1* | 6/2013 | Jacobs .................. G08B 19/00 340/521 |
| 2013/0322687 A1* | 12/2013 | Kritt ....................... G06T 11/00 382/103 |
| 2014/0192206 A1* | 7/2014 | Holz ................ H04N 5/23218 348/169 |
| 2014/0197948 A1* | 7/2014 | Mo ....................... H04W 64/00 340/539.13 |
| 2014/0240088 A1* | 8/2014 | Robinette ......... G08B 13/1427 340/5.61 |
| 2014/0267716 A1 | 9/2014 | Child et al. |
| 2015/0042795 A1* | 2/2015 | Tsuria .................... H04N 5/225 348/143 |
| 2015/0091702 A1* | 4/2015 | Gupta ................ G06K 7/10207 340/10.4 |
| 2015/0163463 A1 | 6/2015 | Hwang et al. |
| 2015/0356498 A1* | 12/2015 | Casanova ............. G07B 15/02 705/13 |
| 2016/0364009 A1* | 12/2016 | Lemberger ............. G06F 3/017 |
| 2017/0068831 A1* | 3/2017 | Hanis ................... G06Q 10/087 |
| 2017/0215034 A1* | 7/2017 | Blowers ................ H04W 4/021 |
| 2017/0301200 A1* | 10/2017 | Siminoff ............. G08B 13/196 |
| 2017/0328997 A1* | 11/2017 | Silverstein ............ G01S 13/765 |
| 2017/0337792 A1* | 11/2017 | Bermudez Rodriguez .................. G06K 7/10099 |
| 2018/0146264 A1* | 5/2018 | Wolf .................... H04N 21/4722 |
| 2019/0062107 A1* | 2/2019 | Salmikuukka ........... B66B 1/468 |
| 2019/0370990 A1* | 12/2019 | Swope .................... G06T 17/00 |

FOREIGN PATENT DOCUMENTS

| | | |
|---|---|---|
| EP | 0944883 A1 | 6/1998 |
| EP | 1480462 A1 | 11/2004 |
| GB | 2286283 A | 8/1995 |
| GB | 2354394 A | 3/2001 |
| GB | 2357387 A | 6/2001 |
| GB | 2400958 A | 10/2004 |
| JP | 2001-103463 A | 4/2001 |
| JP | 2002-033839 A | 1/2002 |
| JP | 2002-125059 A | 4/2002 |
| JP | 2002-342863 A | 11/2002 |
| JP | 2002-344640 A | 11/2002 |
| JP | 2002-354137 A | 12/2002 |
| JP | 2002-368890 A | 12/2002 |
| JP | 2003-283696 A | 10/2003 |
| JP | 2004-128835 A | 4/2004 |
| JP | 2005-341040 A | 12/2005 |
| JP | 2006-147650 A | 6/2006 |
| JP | 2006-262342 A | 9/2006 |
| JP | 2009-008925 A | 1/2009 |
| WO | 1998/39894 A1 | 9/1998 |
| WO | 2001/13638 A1 | 2/2001 |

(56) References Cited

FOREIGN PATENT DOCUMENTS

| | | |
|---|---|---|
| WO | 2001/93220 A1 | 12/2001 |
| WO | 2002/085019 A1 | 10/2002 |
| WO | 2003/028375 A1 | 4/2003 |
| WO | 2003/096696 A1 | 11/2003 |
| WO | 2006/038760 A1 | 4/2006 |
| WO | 2006/067782 A1 | 6/2006 |
| WO | 2007/125143 A1 | 8/2007 |

* cited by examiner

MONITORING AND LOCATING TRACKED OBJECTS USING AUDIO/VIDEO RECORDING AND COMMUNICATION DEVICES

CROSS-REFERENCE TO RELATED APPLICATION

This application claims priority to provisional application Ser. No. 62/550,976, filed on Aug. 28, 2017, the entire contents of which are hereby incorporated by reference.

TECHNICAL FIELD

The present embodiments relate to audio/video (AN) recording and communication devices, including A/V recording and communication doorbell systems. In particular, the present embodiments relate to improvements in the functionality of A/V recording and communication devices that strengthen the ability of such devices to reduce crime and enhance public safety.

BACKGROUND

Home security is a concern for many homeowners and renters. Those seeking to protect or monitor their homes often wish to have video and audio communications with visitors, for example, those visiting an external door or entryway. AudioNideo (A/V) recording and communication devices, such as doorbells, provide this functionality, and can also aid in crime detection and prevention. For example, audio and/or video captured by an A/V recording and communication device can be uploaded to the cloud and recorded on a remote server. Subsequent review of the A/V footage can aid law enforcement in capturing perpetrators of home burglaries and other crimes. Further, the presence of one or more A/V recording and communication devices on the exterior of a home, such as a doorbell unit at the entrance to the home, acts as a powerful deterrent against would-be burglars.

SUMMARY

The various embodiments of the present monitoring and locating tracked objects using audio/video (A/V) recording and communication devices have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description," one will understand how the features of the present embodiments provide the advantages described herein.

One aspect of the present embodiments includes the realization that objects may be misplaced, stolen, or kidnapped. For example, inanimate objects, such as jewelry, bicycles, vehicles, etc., or even animate/living objects, such as people or pets, may be removed and/or stolen from a user's premises. It would be advantageous, therefore, if the functionality of A/V recording and communication devices could be leveraged to monitor and locate objects, and/or identify and apprehend suspected thieves and kidnappers. The present embodiments solve this problem by providing a long-range tag device that may be secured to an object (may also be referred to as a "tracked object") for monitoring about a user's premises. In various embodiments, the tag device may transmit tag data, where the tag device may be compatible for use in a low-power wide-area network (LP-WAN) having long-range communications capabilities at a low bit rate. Further, a smart-home hub device and/or a first A/V recording and communication device may be configured to receive the tag data and determine when the tracked object has been removed from the premises using the tag data. In addition, a tracked object may be located using the tag device secured to the tracked object. For example, if the tracked object is determined to be missing and/or stolen, a backend server may transmit the tag data to one or more second A/V recording and communication devices, located in various locations. The tracked object may be located when the tag data associated with the tracked object is captured by one of the second A/V recording and communication devices. Further, upon locating a tracked object, the second A/V recording and communication device may capture image data of the tracked object and/or the suspected thief of the tracked object. These and other aspects and advantages of the present embodiments are described in further detail below.

In a first aspect, a method for monitoring an object using a smart-home hub device in network communication with audio/video (A/V) recording and communication devices is provided, the method comprising: associating, by the smart-home hub device, a tag having tag data compatible for use in a LPWAN with at least one tracked object to be located when missing, wherein the tag is configured to transmit the tag data using a communication module; activating the smart-home hub device to monitor the at least one tracked object on a premises by listening for the tag data transmitted by the tag; determining when the at least one tracked object has been removed from the premises using the tag data; and transmitting, from the smart-home hub device, to a first client device associated with a first A/V recording and communication device, an alert upon a determination that the at least one tracked object has been removed from the premises.

In an embodiment of the first aspect, the method further comprises determining that the at least one tracked object has been removed from the premises when the tag data transmitted by the tag is not received by the smart-home hub device within a predetermined amount of time.

In another embodiment of the first aspect, the method further comprises receiving the tag data, from the tag, at the smart-home hub device, wherein the tag data includes location data and determining that the at least one tracked object has been removed from the premises when the location data indicates that the tag is beyond a perimeter of the premises.

In another embodiment of the first aspect, the method further comprises receiving the tag data, from the tag, at the smart-home hub device, wherein the tag data includes location data, and determining that the at least one tracked object has been removed from the premises when the location data indicates that the tag is moving away from the smart-home hub device.

In another embodiment of the first aspect, the tag is configured to transmit the tag data using chirp spread spectrum (CSS) modulation techniques.

In another embodiment of the first aspect, the smart-home hub device comprises a communication module configured to receive the tag data using CSS demodulation techniques.

In another embodiment of the first aspect, the tag data is LoRa data.

In another embodiment of the first aspect, the tag is a LoRa tracker configured to transmit the LoRa data.

In another embodiment of the first aspect, the smart-home hub device comprises a communication module configured to receive LoRa data.

In another embodiment of the first aspect, the tag is configured to transmit the tag data using ultra narrowband (UNB) modulation techniques.

In another embodiment of the first aspect, the smart-home hub device comprises a communication module configured to receive the tag data using UNB demodulation techniques.

In another embodiment of the first aspect, the method further comprises transmitting, from the smart-home hub device, to a backend server, an output signal that includes the tag data and identifies the at least one tracked object as missing.

In a second aspect, a method for monitoring an object using audio/video (A/V) recording and communication devices is provided, the method comprising: receiving, from a smart-home hub device, at a backend server, an output signal that includes tag data compatible for use in a low-power wide-area network (LPWAN), wherein the output signal identifies at least one tracked object as missing; transmitting, from the backend server, to a plurality of A/V recording and communication devices, a locate object signal that includes the tag data and a command to locate the at least one tracked object using the tag data; receiving, from one of the plurality of A/V recording and communication devices, image data of the at least one tracked object captured using a camera of the one of the plurality of second A/V recording and communication devices; and transmitting, from the backend server to a client device associated with the smart-home hub device, an object found signal comprising the image data of the at least one tracked object.

In an embodiment of the second aspect, the method further comprises transmitting, from the backend server, to the one of the plurality of A/V recording and communication devices, a power-up command signal wherein the power-up command signal configures the one of the plurality of A/V recording and communication devices to power up the camera and capture the image data of the at least one tracked object.

In another embodiment of the second aspect, the image data includes images of a suspected thief of the at least one tracked object.

In another embodiment of the second aspect, each of the plurality of A/V recording and communication devices comprises a communication module configured to receive the tag data using chirp spread spectrum (CSS) demodulation techniques.

In another embodiment of the second aspect, the tag data is LoRa data.

In another embodiment of the second aspect, each of the plurality of A/V recording and communication devices comprises a communication module configured to receive LoRa data.

In another embodiment of the second aspect, each of the plurality of A/V recording and communication devices comprises a communication module configured to receive tag data using ultra narrowband (UNB) demodulation techniques.

In a third aspect, a method for monitoring an object using audio/video (A/V) recording and communication devices is provided, the method comprising: receiving, from a first A/V recording and communication device, at a backend server, an output signal that includes tag data compatible for use in a low-power wide-area network (LPWAN), wherein the output signal identifies at least one tracked object as missing; transmitting, from the backend server, to a plurality of second A/V recording and communication devices, a locate object signal that includes the tag data and a command to locate the at least one tracked object using the tag data; receiving, from one of the plurality of second A/V recording and communication devices, second image data that includes image data of the at least one tracked object captured using a camera of the one of the plurality of second A/V recording and communication devices; and transmitting, from the backend server to a client device associated with the first A/V recording and communication device, an object found signal comprising the second image data that includes the image data of the at least one tracked object.

In an embodiment of the third aspect, the method further comprises transmitting, from the backend server, to the one of the plurality of second A/V recording and communication devices, a power-up command signal wherein the power-up command signal configures the one of the plurality of second A/V recording and communication devices to power up the camera and capture the second image data that includes the image data of the at least one tracked object.

In another embodiment of the third aspect, the second image data includes images of a suspected thief of the at least one tracked object.

In another embodiment of the third aspect, each of the plurality of second A/V recording and communication devices comprises a communication module configured to receive the tag data using chirp spread spectrum (CSS) demodulation techniques.

In another embodiment of the third aspect, the tag data is LoRa data.

In another embodiment of the third aspect, each of the plurality of second A/V recording and communication devices comprises a communication module configured to receive LoRa data.

In another embodiment of the third aspect, each of the plurality of second A/V recording and communication devices comprises a communication module configured to receive tag data using ultra narrowband (UNB) demodulation techniques.

In a fourth aspect, a method for locating a missing object using an audio/video (A/V) recording and communication device is provided, the A/V recording and communication device including a camera and a communication module, the method comprising: receiving, from a backend server, using the communication module, a locate object signal that identifies a tracked object as missing, wherein the locate object signal includes tag data compatible for use in a low-power wide-area network (LPWAN) and a command to locate the tracked object using the tag data; listening for, and detecting, using the communication module, the tag data transmitted by the tag; recording, using the camera, image data that includes image data of the tracked object; and transmitting, to the backend server, an object found signal comprising the image data that includes the image data of the tracked object.

Another embodiment of the fourth aspect further comprises receiving, from the backend server, a power-up command signal wherein the power-up command signal configures the A/V recording and communication device to power up the camera and capture the image data that includes the image data of the tracked object.

In another embodiment of the fourth aspect, the image data includes images of a suspected thief of the tracked object.

BRIEF DESCRIPTION OF THE DRAWINGS

The various embodiments of the present monitoring and locating tracked objects using audio/video (A/V) recording and communication devices now will be discussed in detail with an emphasis on highlighting the advantageous features. These embodiments depict the novel and non-obvious tracking and locating missing objects using A/V recording and communication devices shown in the accompanying drawings, which are for illustrative purposes only. These drawings include the following figures, in which like numerals indicate like parts.

DETAILED DESCRIPTION

Figure 1:
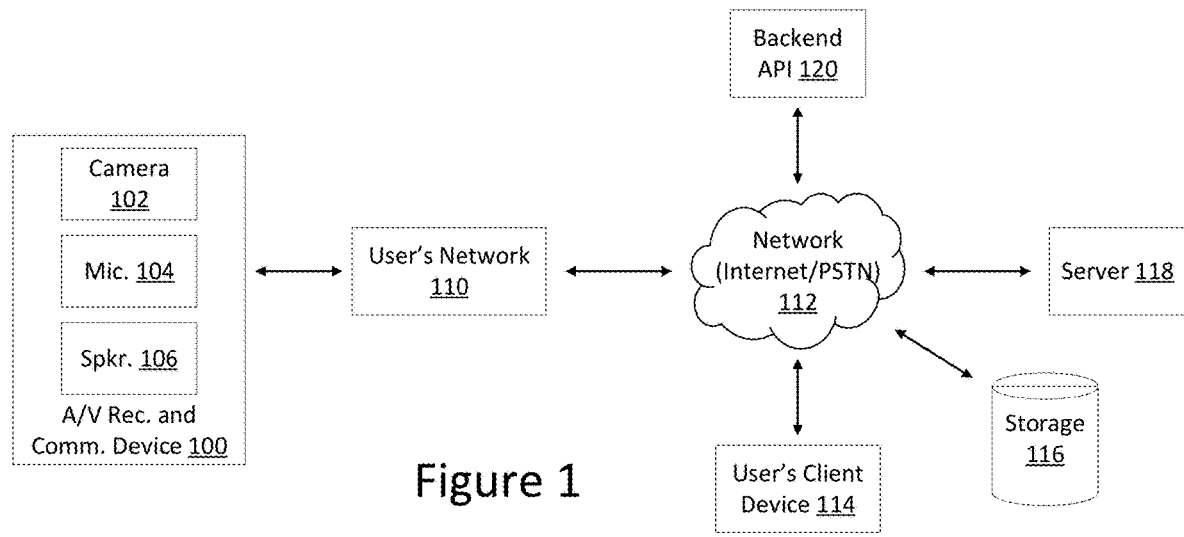
FIG. 1 is a functional block diagram illustrating a system for streaming and storing A/V content captured by an audio/video (A/V) recording and communication device according to various aspects of the present disclosure.

The following detailed description describes the present embodiments with reference to the drawings. In the drawings, reference numbers label elements of the present embodiments. These reference numbers are reproduced below in connection with the discussion of the corresponding drawing features.

The embodiments of the present monitoring and locating tracked objects using audio/video (A/V) recording and communication devices are described below with reference to the figures. These figures, and their written descriptions, indicate that certain components of the apparatus are formed integrally, and certain other components are formed as separate pieces. Those of ordinary skill in the art will appreciate that components shown and described herein as being formed integrally may in alternative embodiments be formed as separate pieces. Those of ordinary skill in the art will further appreciate that components shown and described herein as being formed as separate pieces may in alternative embodiments be formed integrally. Further, as used herein the term integral describes a single unitary piece.

With reference to FIG. 1, the present embodiments include an audio/video (A/V) device 100. While the present disclosure provides numerous examples of methods and systems including A/V recording and communication doorbells, the present embodiments are equally applicable for A/V recording and communication devices other than doorbells. For example, the present embodiments may include one or more A/V recording and communication security cameras instead of, or in addition to, one or more A/V recording and communication doorbells. An example A/V recording and communication security camera may include substantially all of the structure and/or functionality of the doorbells described herein, but without the front button and related components.

The A/V recording and communication device 100 may be located near the entrance to a structure (not shown), such as a dwelling, a business, a storage facility, etc. The A/V recording and communication device 100 includes a camera 102, a microphone 104, and a speaker 106. The camera 102 may comprise, for example, a high definition (HD) video camera, such as one capable of capturing video images at an image display resolution of 1080p or better. While not shown, the A/V recording and communication device 100 may also include other hardware and/or components, such as a housing, a communication module (which may facilitate wired and/or wireless communication with other devices), one or more motion sensors (and/or other types of sensors), a button, etc. The A/V recording and communication device 100 may further include similar componentry and/or functionality as the wireless communication doorbells described in US Patent Application Publication Nos. 2015/0022620 (application Ser. No. 14/499,828) and 2015/0022618 (application Ser. No. 14/334,922), both of which are incorporated herein by reference in their entireties as if fully set forth.

With further reference to FIG. 1, the A/V recording and communication device 100 communicates with a user's network 110, which may be for example a wired and/or wireless network. If the user's network 110 is wireless, or includes a wireless component, the network 110 may be a Wi-Fi network compatible with the IEEE 802.11 standard and/or other wireless communication standard(s). The user's network 110 is connected to another network 112, which may comprise, for example, the Internet and/or a public switched telephone network (PSTN). As described below, the A/V recording and communication device 100 may communicate with the user's client device 114 via the user's network 110 and the network 112 (Internet/PSTN). The user's client device 114 may comprise, for example, a mobile telephone (may also be referred to as a cellular telephone), such as a smartphone, a personal digital assistant (PDA), or another communication device. The user's client device 114 comprises a display (not shown) and related components capable of displaying streaming and/or recorded video images. The user's client device 114 may also comprise a speaker and related components capable of broadcasting streaming and/or recorded audio, and may also comprise a microphone. The A/V recording and communication device 100 may also communicate with one or more remote storage device(s) 116 (may be referred to interchangeably as "cloud storage device(s)"), one or more servers 118, and/or a backend API (application programming interface) 120 via the user's network 110 and the network 112 (Internet/PSTN). While FIG. 1 illustrates the storage device 116, the server 118, and the backend API 120 as components separate from the network 112, it is to be understood that the storage device 116, the server 118, and/or the backend API 120 may be considered to be components of the network 112.

The network 112 may be any wireless network or any wired network, or a combination thereof, configured to operatively couple the above-mentioned modules, devices, and systems as shown in FIG. 1. For example, the network 112 may include one or more of the following: a PSTN (public switched telephone network), the Internet, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a DSL (Digital Subscriber Line) connection, an Ethernet connection, an ISDN (Integrated Services Digital Network) line, a dial-up port such as a V.90, V.34, or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), LTE, VoLTE, LoRaWAN, LPWAN, RPMA, LTE Cat-"X" (e.g. LTE Cat 1, LTE Cat 0, LTE CatM1, LTE Cat NB1), CDMA (Code Division Multiple Access), TDMA (Time Division Multiple Access), FDMA (Frequency Division Multiple Access), and/or OFDMA (Orthogonal Frequency Division Multiple Access) cellular phone networks, GPS, CDPD (cellular digital packet data), RIM (Research in Motion, Limited) duplex paging network, Bluetooth radio, or an IEEE 802.11-based radio frequency network. The network can further include or interface with any one or more of the following: RS-232 serial connection, IEEE-1394 (Firewire) connection, Fibre Channel connection, IrDA (infrared) port, SCSI (Small Computer Systems Interface) connection, USB (Universal Serial Bus) connection, or other wired or wireless, digital or analog, interface or connection, mesh or Digi® networking.

According to one or more aspects of the present embodiments, when a person (may be referred to interchangeably as "visitor") arrives at the A/V recording and communication device 100, the A/V recording and communication device 100 detects the visitor's presence and begins capturing video images within a field of view of the camera 102. The A/V communication device 100 may also capture audio through the microphone 104. The A/V recording and communication device 100 may detect the visitor's presence by detecting motion using the camera 102 and/or a motion sensor, and/or by detecting that the visitor has pressed a front button of the A/V recording and communication device 100 (if the A/V recording and communication device 100 is a doorbell).

In response to the detection of the visitor, the A/V recording and communication device 100 sends an alert to the user's client device 114 (FIG. 1) via the user's network 110 and the network 112. The A/V recording and communication device 100 also sends streaming video, and may also send streaming audio, to the user's client device 114. If the user answers the alert, two-way audio communication may then occur between the visitor and the user through the A/V recording and communication device 100 and the user's client device 114. The user may view the visitor throughout the duration of the call, but the visitor cannot see the user (unless the A/V recording and communication device 100 includes a display, which it may in some embodiments).

The video images captured by the camera 102 of the A/V recording and communication device 100 (and the audio captured by the microphone 104) may be uploaded to the cloud and recorded on the remote storage device 116 (FIG. 1). In some embodiments, the video and/or audio may be recorded on the remote storage device 116 even if the user chooses to ignore the alert sent to his or her client device 114.

With further reference to FIG. 1, the system may further comprise a backend API 120 including one or more components. A backend API (application programming interface) may comprise, for example, a server (e.g. a real server, or a virtual machine, or a machine running in a cloud infrastructure as a service), or multiple servers networked together, exposing at least one API to client(s) accessing it. These servers may include components such as application servers (e.g. software servers), depending upon what other components are included, such as a caching layer, or database layers, or other components. A backend API may, for example, comprise many such applications, each of which communicate with one another using their public APIs. In some embodiments, the API backend may hold the bulk of the user data and offer the user management capabilities, leaving the clients to have very limited state.

The backend API 120 illustrated FIG. 1 may include one or more APIs. An API is a set of routines, protocols, and tools for building software and applications. An API expresses a software component in terms of its operations, inputs, outputs, and underlying types, defining functionalities that are independent of their respective implementations, which allows definitions and implementations to vary without compromising the interface. Advantageously, an API may provide a programmer with access to an application's functionality without the programmer needing to modify the application itself, or even understand how the application works. An API may be for a web-based system, an operating system, or a database system, and it provides facilities to develop applications for that system using a given programming language. In addition to accessing databases or computer hardware like hard disk drives or video cards, an API can ease the work of programming GUI components. For example, an API can facilitate integration of new features into existing applications (a so-called "plug-in API"). An API can also assist otherwise distinct applications with sharing data, which can help to integrate and enhance the functionalities of the applications.

The backend API 120 illustrated in FIG. 1 may further include one or more services (also referred to as network services). A network service is an application that provides data storage, manipulation, presentation, communication, and/or other capability. Network services are often implemented using a client-server architecture based on application-layer network protocols. Each service may be provided by a server component running on one or more computers (such as a dedicated server computer offering multiple services) and accessed via a network by client components running on other devices. However, the client and server components can both be run on the same machine. Clients and servers may have a user interface, and sometimes other hardware associated with them.

Figure 2:
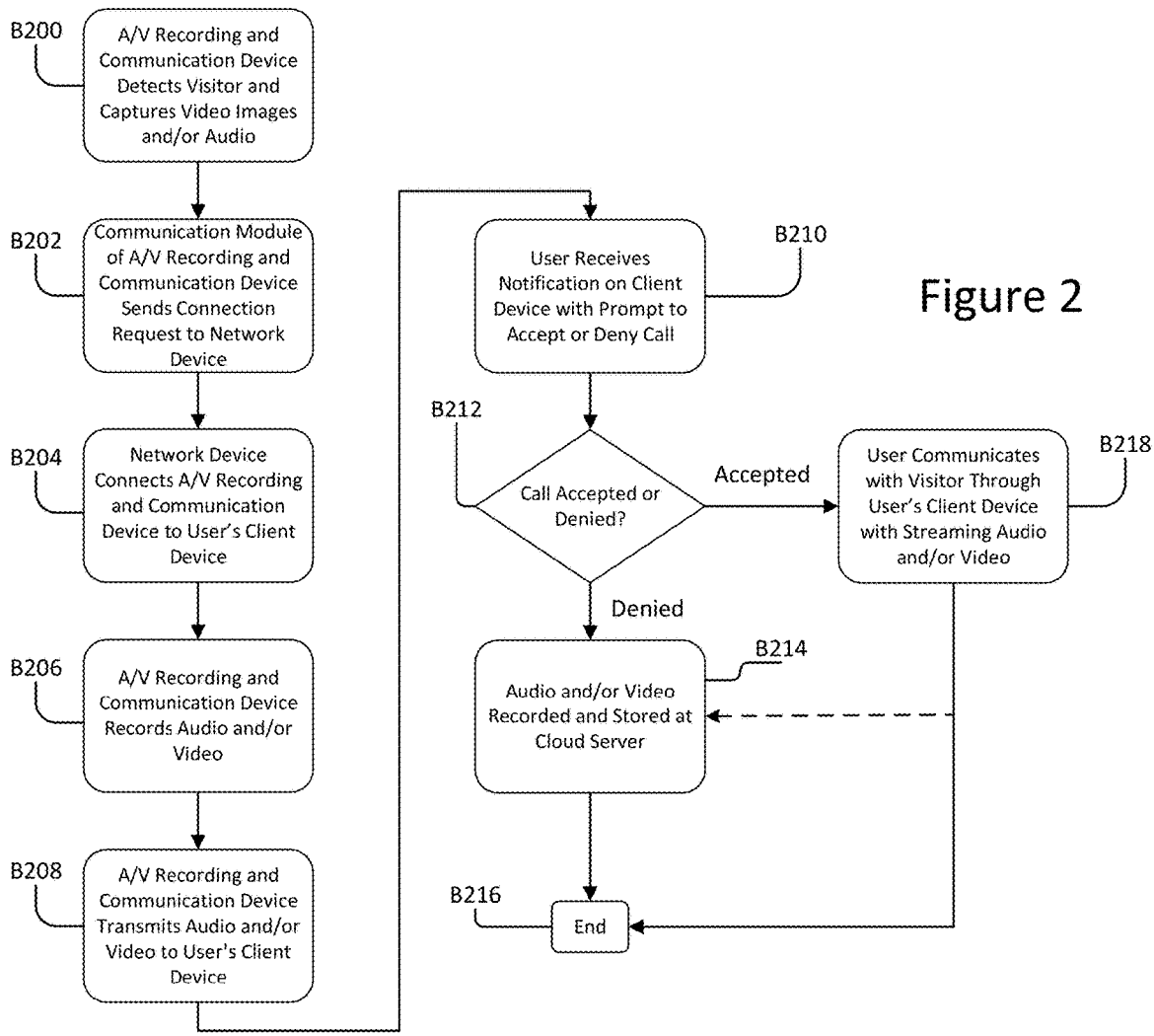
FIG. 2 is a flowchart illustrating a process for streaming and storing A/V content from an A/V recording and communication device according to various aspects of the present disclosure.

FIG. 2 is a flowchart illustrating a process for streaming and storing A/V content from the A/V recording and communication device 100 according to various aspects of the present disclosure. At block B200, the A/V recording and communication device 100 detects the visitor's presence and captures video images within a field of view of the camera 102. The A/V recording and communication device 100 may also capture audio through the microphone 104. As described above, the A/V recording and communication device 100 may detect the visitor's presence by detecting motion using the camera 102 and/or a motion sensor, and/or by detecting that the visitor has pressed a front button of the A/V recording and communication device 100 (if the A/V recording and communication device 100 is a doorbell). Also as described above, the video recording/capture may begin when the visitor is detected, or may begin earlier, as described below.

At block B202, a communication module of the A/V recording and communication device 100 sends a connection request, via the user's network 110 and the network 112, to a device in the network 112. For example, the network device to which the request is sent may be a server such as the server 118. The server 118 may comprise a computer program and/or a machine that waits for requests from other machines or software (clients) and responds to them. A server typically processes data. One purpose of a server is to share data and/or hardware and/or software resources among clients. This architecture is called the client-server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes. In another example, the network device to which the request is sent may be an API such as the backend API 120, which is described above.

In response to the request, at block B204 the network device may connect the A/V recording and communication device 100 to the user's client device 114 through the user's network 110 and the network 112. At block B206, the A/V recording and communication device 100 may record available audio and/or video data using the camera 102, the microphone 104, and/or any other device/sensor available. At block B208, the audio and/or video data is transmitted (streamed) from the A/V recording and communication device 100 to the user's client device 114 via the user's network 110 and the network 112. At block B210, the user may receive a notification on his or her client device 114 with a prompt to either accept or deny the call.

At block B212, the process determines whether the user has accepted or denied the call. If the user denies the notification, then the process advances to block B214, where the audio and/or video data is recorded and stored at a cloud server. The session then ends at block B216 and the connection between the A/V recording and communication device 100 and the user's client device 114 is terminated. If, however, the user accepts the notification, then at block B218 the user communicates with the visitor through the user's client device 114 while audio and/or video data captured by the camera 102, the microphone 104, and/or other devices/sensors is streamed to the user's client device 114. At the end of the call, the user may terminate the connection between the user's client device 114 and the A/V recording and communication device 100 and the session ends at block B216. In some embodiments, the audio and/or video data may be recorded and stored at a cloud server (block B214) even if the user accepts the notification and communicates with the visitor through the user's client device 114.

Figure 3:
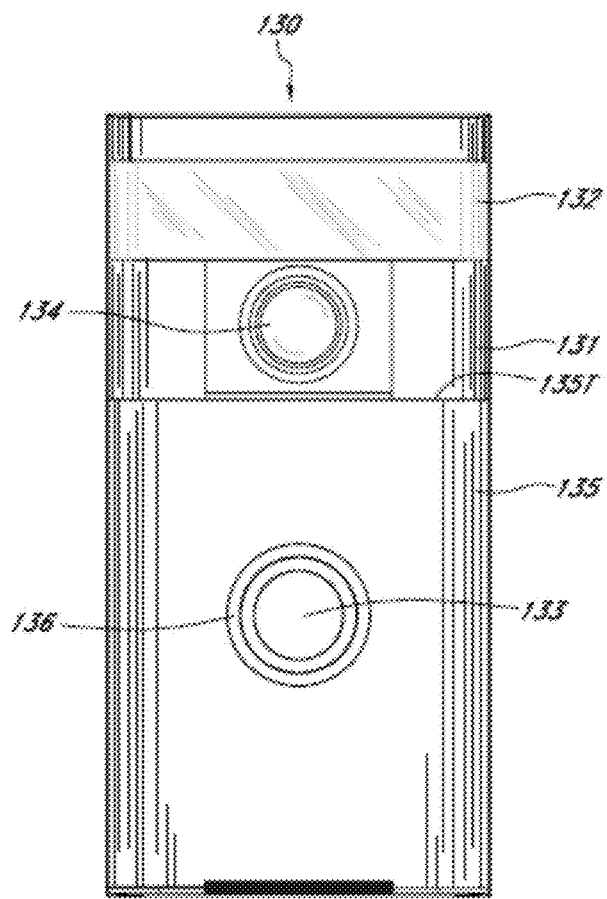
FIG. 3 is a front view of an A/V recording and communication device according to various aspects of the present disclosure.
Figure 4:
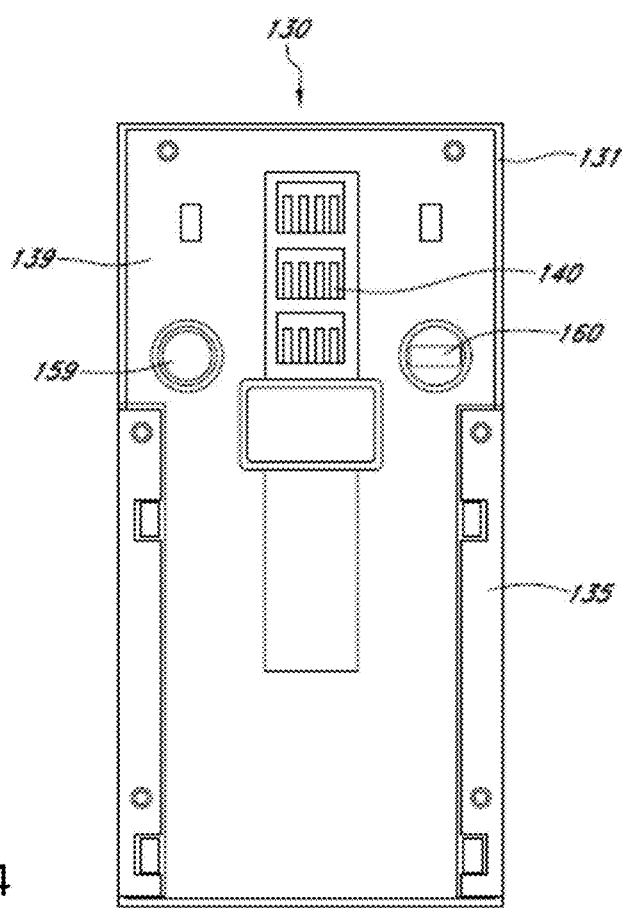
FIG. 4 is a rear view of the A/V recording and communication device of FIG. 3.
Figure 5:
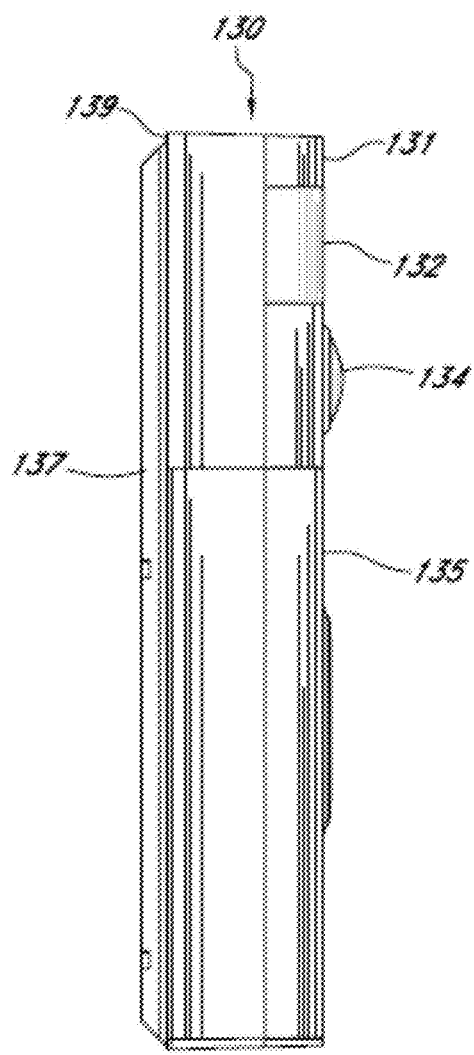
FIG. 5 is a left side view of the A/V recording and communication device of FIG. 3 attached to a mounting bracket according to various aspects of the present disclosure.

FIGS. 3-5 illustrate a wireless audio/video (A/V) communication doorbell 130 according to an aspect of present embodiments. FIG. 3 is a front view, FIG. 4 is a rear view, and FIG. 5 is a left side view of the doorbell 130 coupled with a mounting bracket 137. The doorbell 130 includes a faceplate 135 mounted to a back plate 139 (FIG. 4). With reference to FIG. 5, the faceplate 135 has a substantially flat profile. The faceplate 135 may comprise any suitable material, including, without limitation, metals, such as brushed aluminum or stainless steel, metal alloys, or plastics. The faceplate 135 protects the internal contents of the doorbell 130 and serves as an exterior front surface of the doorbell 130.

With reference to FIG. 3, the faceplate 135 includes a button 133 and a light pipe 136. The button 133 and the light pipe 136 may have various profiles that may or may not match the profile of the faceplate 135. The light pipe 136 may comprise any suitable material, including, without limitation, transparent plastic, that is capable of allowing light produced within the doorbell 130 to pass through. The light may be produced by one or more light-emitting components, such as light-emitting diodes (LED's), contained within the doorbell 130, as further described below. The button 133 may make contact with a button actuator (not shown) located within the doorbell 130 when the button 133 is pressed by a visitor. When pressed, the button 133 may trigger one or more functions of the doorbell 130, as further described below.

With reference to FIGS. 3 and 5, the doorbell 130 further includes an enclosure 131 that engages the faceplate 135. In the illustrated embodiment, the enclosure 131 abuts an upper edge 135T (FIG. 3) of the faceplate 135, but in alternative embodiments one or more gaps between the enclosure 131 and the faceplate 135 may facilitate the passage of sound and/or light through the doorbell 130. The enclosure 131 may comprise any suitable material, but in some embodiments the material of the enclosure 131 preferably permits infrared light to pass through from inside the doorbell 130 to the environment and vice versa. The doorbell 130 further includes a lens 132. In some embodiments, the lens may comprise a Fresnel lens, which may be patterned to deflect incoming light into one or more infrared sensors located within the doorbell 130. The doorbell 130 further includes a camera 134, which captures video data when activated, as described below.

FIG. 4 is a rear view of the doorbell 130, according to an aspect of the present embodiments. As illustrated, the enclosure 131 may extend from the front of the doorbell 130 around to the back thereof and may fit snugly around a lip of the back plate 139. The back plate 139 may comprise any suitable material, including, without limitation, metals, such as brushed aluminum or stainless steel, metal alloys, or plastics. The back plate 139 protects the internal contents of the doorbell 130 and serves as an exterior rear surface of the doorbell 130. The faceplate 135 may extend from the front of the doorbell 130 and at least partially wrap around the back plate 139, thereby allowing a coupled connection between the faceplate 135 and the back plate 139. The back plate 139 may have indentations in its structure to facilitate the coupling.

With further reference to FIG. 4, spring contacts 140 may provide power to the doorbell 130 when mated with other conductive contacts connected to a power source. The spring contacts 140 may comprise any suitable conductive material, including, without limitation, copper, and may be capable of deflecting when contacted by an inward force, for example the insertion of a mating element. The doorbell 130 further comprises a connector 160, such as a micro-USB or other connector, whereby power and/or data may be supplied to and from the components within the doorbell 130. A reset button 159 may be located on the back plate 139, and may make contact with a button actuator (not shown) located within the doorbell 130 when the reset button 159 is pressed. When the reset button 159 is pressed, it may trigger one or more functions, as described below.

FIG. 5 is a left side profile view of the doorbell 130 coupled to the mounting bracket 137, according to an aspect of the present embodiments. The mounting bracket 137 facilitates mounting the doorbell 130 to a surface, such as the exterior of a building, such as a home or office. As illustrated in FIG. 5, the faceplate 135 may extend from the bottom of the doorbell 130 up to just below the camera 134, and connect to the back plate 139 as described above. The lens 132 may extend and curl partially around the side of the doorbell 130. The enclosure 131 may extend and curl around the side and top of the doorbell 130, and may be coupled to the back plate 139 as described above. The camera 134 may protrude slightly through the enclosure 131, thereby giving it a wider field of view. The mounting bracket 137 may couple with the back plate 139 such that they contact each other at various points in a common plane of contact, thereby creating an assembly including the doorbell 130 and the mounting bracket 137. The couplings described in this paragraph, and elsewhere, may be secured by, for example and without limitation, screws, interference fittings, adhesives, or other fasteners. Interference fittings may refer to a type of connection where a material relies on pressure and/or gravity coupled with the material's physical strength to support a connection to a different element.

Figure 6:
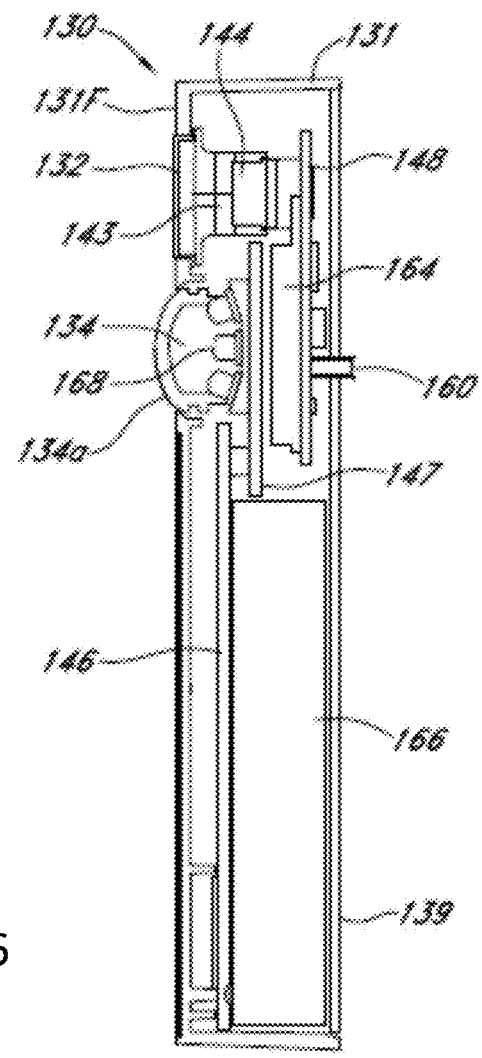
FIG. 6 is cross-sectional right side view of the A/V recording and communication device of FIG. 3.

FIG. 6 is a right side cross-sectional view of the doorbell 130 without the mounting bracket 137. In the illustrated embodiment, the lens 132 is substantially coplanar with the front surface 131F of the enclosure 131. In alternative embodiments, the lens 132 may be recessed within the enclosure 131 or may protrude outward from the enclosure 131. The camera 134 is coupled to a camera printed circuit board (PCB) 147, and a lens 134a of the camera 134 protrudes through an opening in the enclosure 131. The camera lens 134a may be a lens capable of focusing light into the camera 134 so that clear images may be taken.

The camera PCB 147 may be secured within the doorbell with any suitable fasteners, such as screws, or interference connections, adhesives, etc. The camera PCB 147 comprises various components that enable the functionality of the camera 134 of the doorbell 130, as described below. Infrared light-emitting components, such as infrared LED's 168, are coupled to the camera PCB 147 and may be triggered to activate when a light sensor detects a low level of ambient light. When activated, the infrared LED's 168 may emit infrared light through the enclosure 131 and/or the camera 134 out into the ambient environment. The camera 134, which may be configured to detect infrared light, may then capture the light emitted by the infrared LED's 168 as it reflects off objects within the camera's 134 field of view, so that the doorbell 130 can clearly capture images at night (may be referred to as "night vision").

With continued reference to FIG. 6, the doorbell 130 further comprises a front PCB 146, which in the illustrated embodiment resides in a lower portion of the doorbell 130 adjacent a battery 166. The front PCB 146 may be secured within the doorbell 130 with any suitable fasteners, such as screws, or interference connections, adhesives, etc. The front PCB 146 comprises various components that enable the functionality of the audio and light components, as further described below. The battery 166 may provide power to the doorbell 130 components while receiving power from the spring contacts 140, thereby engaging in a trickle-charge method of power consumption and supply. Alternatively, the doorbell 130 may draw power directly from the spring contacts 140 while relying on the battery 166 only when the spring contacts 140 are not providing the power necessary for all functions. Still further, the battery 166 may comprise the sole source of power for the doorbell 130. In such embodiments, the spring contacts 140 may not be connected to a source of power. When the battery 166 is depleted of its charge, it may be recharged, such as by connecting a power source to the connector 160.

With continued reference to FIG. 6, the doorbell 130 further comprises a power PCB 148, which in the illustrated embodiment resides behind the camera PCB 147. The power PCB 148 may be secured within the doorbell 130 with any suitable fasteners, such as screws, or interference connections, adhesives, etc. The power PCB 148 comprises various components that enable the functionality of the power and device-control components, as further described below.

With continued reference to FIG. 6, the doorbell 130 further comprises a communication module 164 coupled to the power PCB 148. The communication module 164 facilitates communication with client devices in one or more remote locations, as further described below. The connector 160 may protrude outward from the power PCB 148 and extend through a hole in the back plate 139. The doorbell 130 further comprises passive infrared (PIR) sensors 144, which are secured on or within a PIR sensor holder 143, and the assembly resides behind the lens 132. In some embodiments, the doorbell 130 may comprise three PIR sensors 144, as further described below, but in other embodiments any number of PIR sensors 144 may be provided. The PIR sensor holder 143 may be secured to the doorbell 130 with any suitable fasteners, such as screws, or interference connections, adhesives, etc. The PIR sensors 144 may be any type of sensor capable of detecting and communicating the presence of a heat source within their field of view. Further, alternative embodiments may comprise one or more motion sensors either in place of or in addition to the PIR sensors 144. The motion sensors may be configured to detect motion using any methodology, such as a methodology that does not rely on detecting the presence of a heat source within a field of view.

Figure 7:
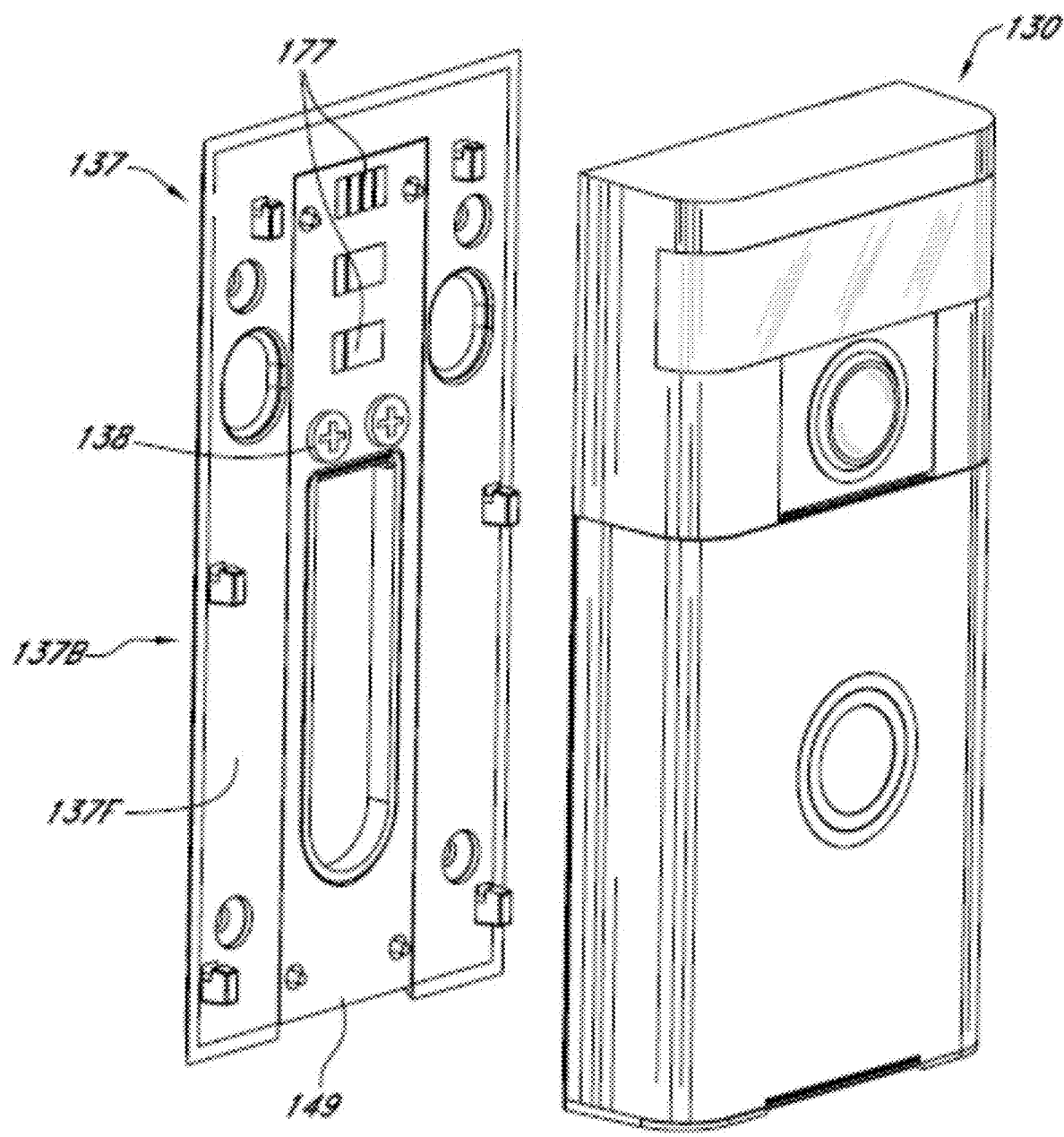
FIG. 7 is an exploded view of the A/V recording and communication device and the mounting bracket of FIG. 5.

FIG. 7 is an exploded view of the doorbell 130 and the mounting bracket 137 according to an aspect of the present embodiments. The mounting bracket 137 is configured to be mounted to a mounting surface (not shown) of a structure, such as a home or an office. FIG. 7 shows the front side 137F of the mounting bracket 137. The mounting bracket 137 is configured to be mounted to the mounting surface such that the back side 137B thereof faces the mounting surface. In certain embodiments the mounting bracket 137 may be mounted to surfaces of various composition, including, without limitation, wood, concrete, stucco, brick, vinyl siding, aluminum siding, etc., with any suitable fasteners, such as screws, or interference connections, adhesives, etc. The doorbell 130 may be coupled to the mounting bracket 137 with any suitable fasteners, such as screws, or interference connections, adhesives, etc.

With continued reference to FIG. 7, the illustrated embodiment of the mounting bracket 137 includes the terminal screws 138. The terminal screws 138 are configured to receive electrical wires adjacent the mounting surface of the structure upon which the mounting bracket 137 is mounted, so that the doorbell 130 may receive electrical power from the structure's electrical system. The terminal screws 138 are electrically connected to electrical contacts 177 of the mounting bracket. If power is supplied to the terminal screws 138, then the electrical contacts 177 also receive power through the terminal screws 138. The electrical contacts 177 may comprise any suitable conductive material, including, without limitation, copper, and may protrude slightly from the face of the mounting bracket 137 so that they may mate with the spring contacts 140 located on the back plate 139.

Figure 8:
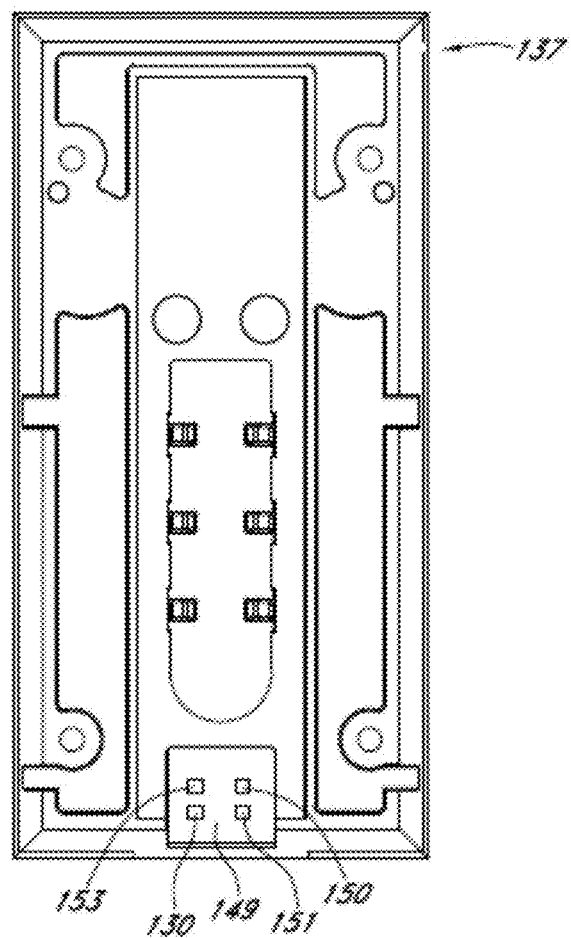
FIG. 8 is a rear view of the mounting bracket of FIG. 5.

With reference to FIGS. 7 and 8 (which is a rear view of the mounting bracket 137), the mounting bracket 137 further comprises a bracket PCB 149. With reference to FIG. 8, the bracket PCB 149 is situated outside the doorbell 130, and is therefore configured for various sensors that measure ambient conditions, such as an accelerometer 150, a barometer 151, a humidity sensor 152, and a temperature sensor 153. The functions of these components are discussed in more detail below. The bracket PCB 149 may be secured to the mounting bracket 137 with any suitable fasteners, such as screws, or interference connections, adhesives, etc.

Figure 9:
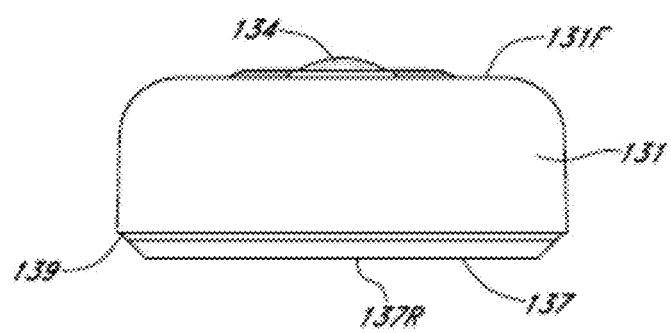
FIGS. 9 and 10 are top and bottom views, respectively, of the A/V recording and communication device and the mounting bracket of FIG. 5.
Figure 10:
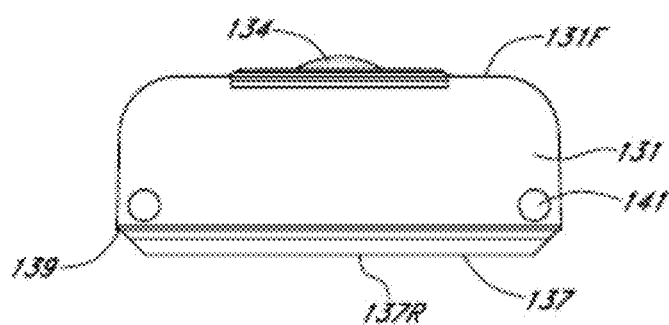

FIGS. 9 and 10 are top and bottom views, respectively, of the doorbell 130. As described above, the enclosure 131 may extend from the front face 131F of the doorbell 130 to the back, where it contacts and snugly surrounds the back plate 139. The camera 134 may protrude slightly beyond the front face 131F of the enclosure 131, thereby giving the camera 134 a wider field of view. The mounting bracket 137 may include a substantially flat rear surface 137R, such that the doorbell 130 and the mounting bracket 137 assembly may sit flush against the surface to which they are mounted. With reference to FIG. 10, the lower end of the enclosure 131 may include security screw apertures 141 configured to receive screws or other fasteners.

Figure 11:
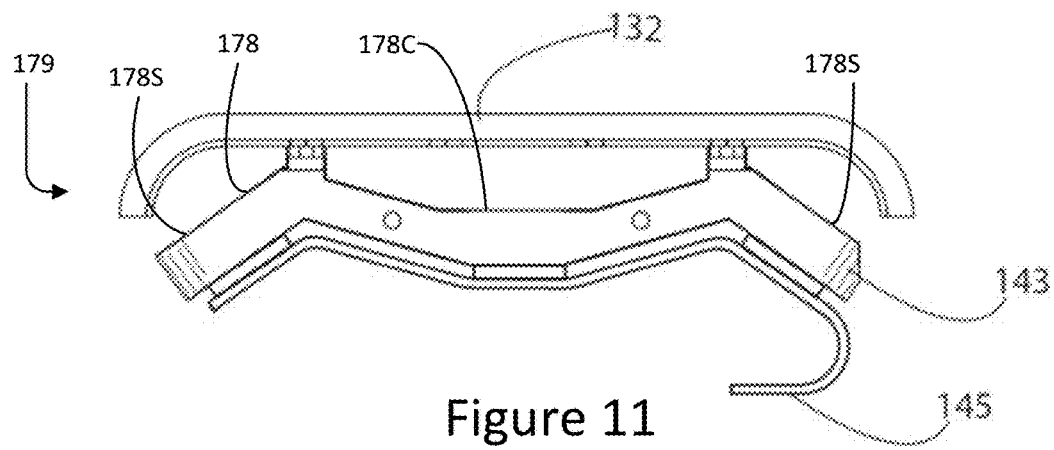
FIG. 11 is a top view of a passive infrared sensor assembly according to various aspects of the present disclosure.
Figure 12:
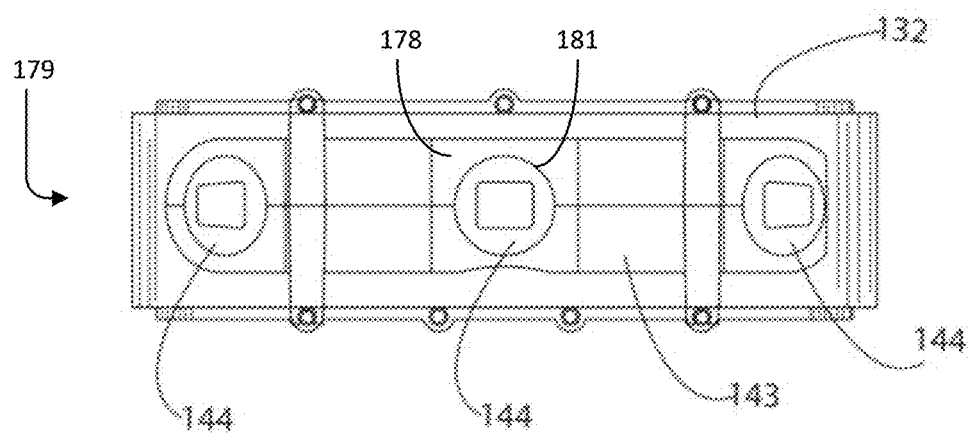
FIG. 12 is a front view of the passive infrared sensor assembly of FIG. 11.

FIG. 11 is a top view and FIG. 12 is a front view of a passive infrared sensor assembly 179 including the lens 132, the passive infrared sensor holder 143, the passive infrared sensors 144, and a flexible power circuit 145. The passive infrared sensor holder 143 is configured to mount the passive infrared sensors 144 facing out through the lens 132 at varying angles, thereby allowing the passive infrared sensor 144 field of view to be expanded to 180° or more and also broken up into various zones, as further described below. The passive infrared sensor holder 143 may include one or more faces 178, including a center face 178C and two side faces 178S to either side of the center face 178C. With reference to FIG. 12, each of the faces 178 defines an opening 181 within or on which the passive infrared sensors 144 may be mounted. In alternative embodiments, the faces 178 may not include openings 181, but may instead comprise solid flat faces upon which the passive infrared sensors 144 may be mounted. Generally, the faces 178 may be any physical structure capable of housing and/or securing the passive infrared sensors 144 in place.

With reference to FIG. 11, the passive infrared sensor holder 143 may be secured to the rear face of the lens 132. The flexible power circuit 145 may be any material or component capable of delivering power and/or data to and from the passive infrared sensors 144, and may be contoured to conform to the non-linear shape of the passive infrared sensor holder 143. The flexible power circuit 145 may connect to, draw power from, and/or transmit data to and from, the power printed circuit board 148.

Figure 13:
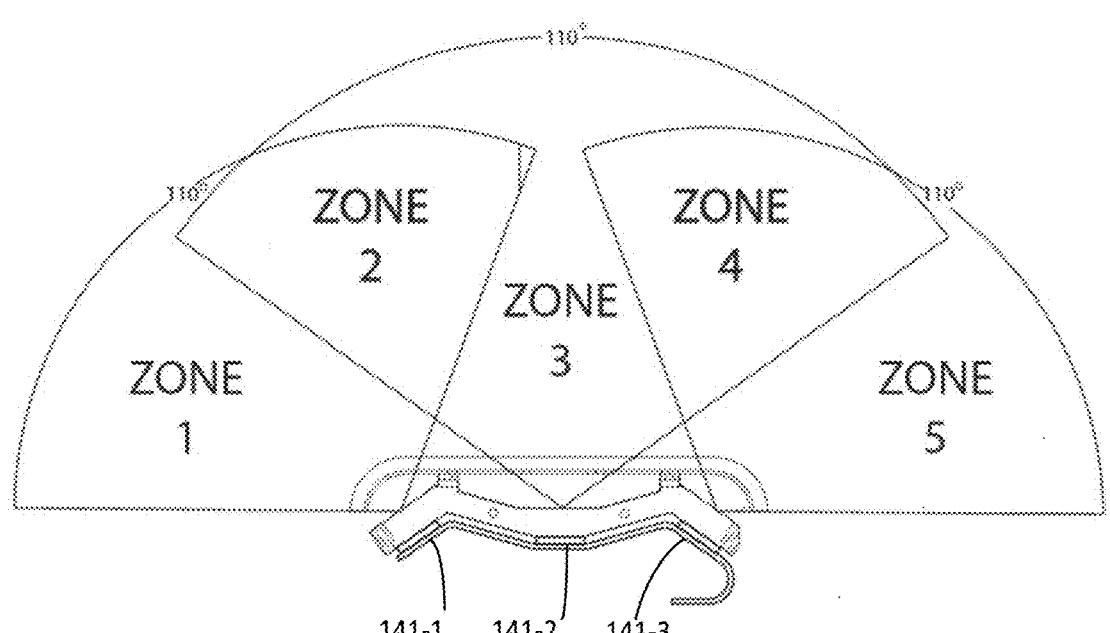
FIG. 13 is a top view of the passive infrared sensor assembly of FIG. 11, illustrating the fields of view of the passive infrared sensors according to various aspects of the present disclosure.

FIG. 13 is a top view of the passive infrared sensor assembly 179 illustrating the fields of view of the passive infrared sensors 144. In the illustrated embodiment, the side faces 178S of the passive infrared sensor holder 143 are angled at 55° facing outward from the center face 178C, and each passive infrared sensor 144 has a field of view of 110°. However, these angles may be increased or decreased as desired. Zone 1 is the area that is visible only to a first one of the passive infrared sensors 144-1. Zone 2 is the area that is visible only to the first passive infrared sensor 144-1 and a second one of the passive infrared sensors 144-2. Zone 3 is the area that is visible only to the second passive infrared sensor 144-2. Zone 4 is the area that is visible only to the second passive infrared sensor 144-2 and a third one of the passive infrared sensors 144-3. Zone 5 is the area that is visible only to the third passive infrared sensor 144-3. In some embodiments, the doorbell 130 may be capable of determining the direction that an object is moving based upon which zones are triggered in a time sequence.

Figure 14:
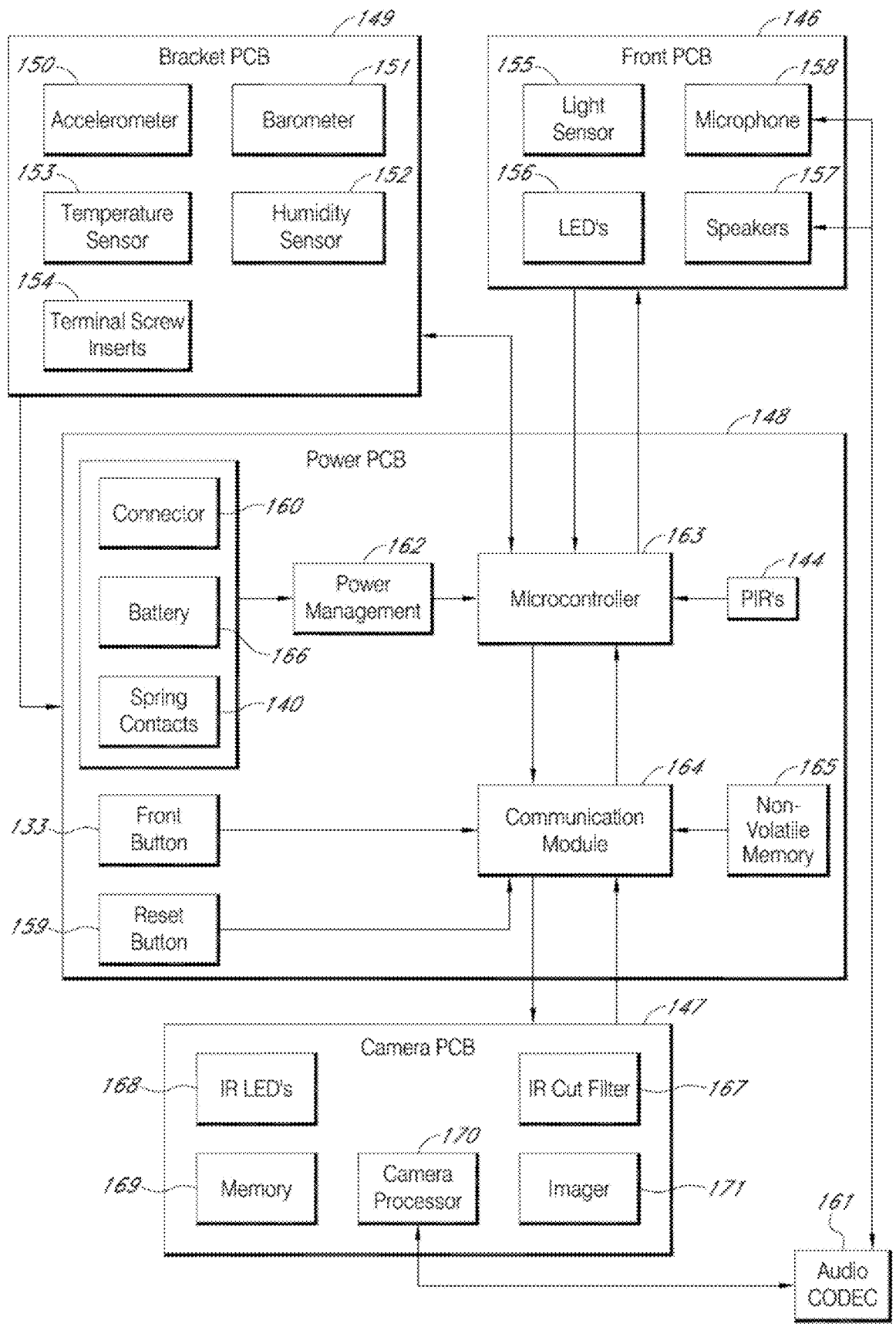
FIG. 14 a functional block diagram of the components of the A/V recording and communication device of FIG. 3.

FIG. 14 is a functional block diagram of the components within or in communication with the doorbell 130, according to an aspect of the present embodiments. As described above, the bracket PCB 149 may comprise an accelerometer 150, a barometer 151, a humidity sensor 152, and a temperature sensor 153. The accelerometer 150 may be one or more sensors capable of sensing motion and/or acceleration. The barometer 151 may be one or more sensors capable of determining the atmospheric pressure of the surrounding environment in which the bracket PCB 149 may be located.

The humidity sensor 152 may be one or more sensors capable of determining the amount of moisture present in the atmospheric environment in which the bracket PCB 149 may be located. The temperature sensor 153 may be one or more sensors capable of determining the temperature of the ambient environment in which the bracket PCB 149 may be located. As described above, the bracket PCB 149 may be located outside the housing of the doorbell 130 so as to reduce interference from heat, pressure, moisture, and/or other stimuli generated by the internal components of the doorbell 130.

With further reference to FIG. 14, the bracket PCB 149 may further comprise terminal screw inserts 154, which may be configured to receive the terminal screws 138 and transmit power to the electrical contacts 177 on the mounting bracket 137 (FIG. 7). The bracket PCB 149 may be electrically and/or mechanically coupled to the power PCB 148 through the terminal screws 138, the terminal screw inserts 154, the spring contacts 140, and the electrical contacts 177. The terminal screws 138 may receive electrical wires located at the surface to which the doorbell 130 is mounted, such as the wall of a building, so that the doorbell can receive electrical power from the building's electrical system. Upon the terminal screws 138 being secured within the terminal screw inserts 154, power may be transferred to the bracket PCB 149, and to all of the components associated therewith, including the electrical contacts 177. The electrical contacts 177 may transfer electrical power to the power PCB 148 by mating with the spring contacts 140.

With further reference to FIG. 14, the front PCB 146 may comprise a light sensor 155, one or more light-emitting components, such as LED's 156, one or more speakers 157, and a microphone 158. The light sensor 155 may be one or more sensors capable of detecting the level of ambient light of the surrounding environment in which the doorbell 130 may be located. LED's 156 may be one or more light-emitting diodes capable of producing visible light when supplied with power. The speakers 157 may be any electro-mechanical device capable of producing sound in response to an electrical signal input. The microphone 158 may be an acoustic-to-electric transducer or sensor capable of converting sound waves into an electrical signal. When activated, the LED's 156 may illuminate the light pipe 136 (FIG. 3). The front PCB 146 and all components thereof may be electrically coupled to the power PCB 148, thereby allowing data and/or power to be transferred to and from the power PCB 148 and the front PCB 146.

The speakers 157 and the microphone 158 may be coupled to the camera processor 170 through an audio CODEC 161. For example, the transfer of digital audio from the user's client device 114 and the speakers 157 and the microphone 158 may be compressed and decompressed using the audio CODEC 161, coupled to the camera processor 170. Once compressed by audio CODEC 161, digital audio data may be sent through the communication module 164 to the network 112, routed by one or more servers 118, and delivered to the user's client device 114. When the user speaks, after being transferred through the network 112, digital audio data is decompressed by audio CODEC 161 and emitted to the visitor via the speakers 157.

With further reference to FIG. 14, the power PCB 148 may comprise a power management module 162, a microcontroller 163 (may also be referred to as "processor," "CPU," or "controller"), the communication module 164, and power PCB non-volatile memory 165. In certain embodiments, the power management module 162 may comprise an integrated circuit capable of arbitrating between multiple voltage rails, thereby selecting the source of power for the doorbell 130. The battery 166, the spring contacts 140, and/or the connector 160 may each provide power to the power management module 162. The power management module 162 may have separate power rails dedicated to the battery 166, the spring contacts 140, and the connector 160. In one aspect of the present disclosure, the power management module 162 may continuously draw power from the battery 166 to power the doorbell 130, while at the same time routing power from the spring contacts 140 and/or the connector 160 to the battery 166, thereby allowing the battery 166 to maintain a substantially constant level of charge. Alternatively, the power management module 162 may continuously draw power from the spring contacts 140 and/or the connector 160 to power the doorbell 130, while only drawing from the battery 166 when the power from the spring contacts 140 and/or the connector 160 is low or insufficient. Still further, the battery 166 may comprise the sole source of power for the doorbell 130. In such embodiments, the spring contacts 140 may not be connected to a source of power. When the battery 166 is depleted of its charge, it may be recharged, such as by connecting a power source to the connector 160. The power management module 162 may also serve as a conduit for data between the connector 160 and the microcontroller 163.

With further reference to FIG. 14, in certain embodiments the microcontroller 163 may comprise an integrated circuit including a processor core, memory, and programmable input/output peripherals. The microcontroller 163 may receive input signals, such as data and/or power, from the PIR sensors 144, the bracket PCB 149, the power management module 162, the light sensor 155, the microphone 158, and/or the communication module 164, and may perform various functions as further described below. When the microcontroller 163 is triggered by the PIR sensors 144, the microcontroller 163 may be triggered to perform one or more functions. When the light sensor 155 detects a low level of ambient light, the light sensor 155 may trigger the microcontroller 163 to enable "night vision," as further described below. The microcontroller 163 may also act as a conduit for data communicated between various components and the communication module 164.

With further reference to FIG. 14, the communication module 164 may comprise an integrated circuit including a processor core, memory, and programmable input/output peripherals. The communication module 164 may also be configured to transmit data wirelessly to a remote network device, and may include one or more transceivers (not shown). The wireless communication may comprise one or more wireless networks, such as, without limitation, Wi-Fi, cellular, Bluetooth, and/or satellite networks. The communication module 164 may receive inputs, such as power and/or data, from the camera PCB 147, the microcontroller 163, the button 133, the reset button 159, and/or the power PCB non-volatile memory 165. When the button 133 is pressed, the communication module 164 may be triggered to perform one or more functions. When the reset button 159 is pressed, the communication module 164 may be triggered to erase any data stored at the power PCB non-volatile memory 165 and/or at the camera PCB memory 169. The communication module 164 may also act as a conduit for data communicated between various components and the microcontroller 163. The power PCB non-volatile memory 165 may comprise flash memory configured to store and/or transmit data. For example, in certain embodiments the power PCB non-volatile memory 165 may comprise serial peripheral interface (SPI) flash memory.

With further reference to FIG. 14, the camera PCB 147 may comprise components that facilitate the operation of the camera 134. For example, an imager 171 may comprise a video recording sensor and/or a camera chip. In one aspect of the present disclosure, the imager 171 may comprise a complementary metal-oxide semiconductor (CMOS) array, and may be capable of recording high definition (e.g., 1080p or better) video files. A camera processor 170 may comprise an encoding and compression chip. In some embodiments, the camera processor 170 may comprise a bridge processor. The camera processor 170 may process video recorded by the imager 171 and audio recorded by the microphone 158, and may transform this data into a form suitable for wireless transfer by the communication module 164 to a network. The camera PCB memory 169 may comprise volatile memory that may be used when data is being buffered or encoded by the camera processor 170. For example, in certain embodiments the camera PCB memory 169 may comprise synchronous dynamic random access memory (SD RAM). IR LED's 168 may comprise light-emitting diodes capable of radiating infrared light. IR cut filter 167 may comprise a system that, when triggered, configures the imager 171 to see primarily infrared light as opposed to visible light. When the light sensor 155 detects a low level of ambient light (which may comprise a level that impedes the performance of the imager 171 in the visible spectrum), the IR LED's 168 may shine infrared light through the doorbell 130 enclosure out to the environment, and the IR cut filter 167 may enable the imager 171 to see this infrared light as it is reflected or refracted off of objects within the field of view of the doorbell. This process may provide the doorbell 130 with the "night vision" function mentioned above.

As discussed above, the present disclosure provides numerous examples of methods and systems including A/V recording and communication doorbells, but the present embodiments are equally applicable for A/V recording and communication devices other than doorbells. For example, the present embodiments may include one or more A/V recording and communication security cameras instead of, or in addition to, one or more A/V recording and communication doorbells. An example A/V recording and communication security camera may include substantially all of the structure and functionality of the doorbell 130, but without the front button 133, the button actuator, and/or the light pipe 136. An example A/V recording and communication security camera may further omit other components, such as, for example, the bracket PCB 149 and its components.

As described above, one aspect of the present embodiments includes the realization that objects may be misplaced, stolen, or kidnapped. For example, inanimate objects, such as jewelry, bicycles, vehicles, etc., or even animate/living objects, such as people or pets, may be removed and/or stolen from a user's premises. It would be advantageous, therefore, if the functionality of A/V recording and communication devices could be leveraged to monitor and locate objects, and/or identify and apprehend suspected thieves and kidnappers. The present embodiments solve this problem by providing a long-range tag device that may be secured to an object (may also be referred to as a "tracked object") for monitoring about a user's premises. In various embodiments, the tag device may transmit tag data, where the tag device may be compatible for use in a low-power wide-area network (LPWAN) having long-range communications capabilities at a low bit rate. Further, a smart-home hub device and/or a first A/V recording and communication device may be configured to receive the tag data and determine when the tracked object has been removed from the premises using the tag data. In addition, a tracked object may be located using the tag device secured to the tracked object. For example, if the tracked object is determined to be missing and/or stolen, a backend server may transmit the tag data to one or more second A/V recording and communication devices, located in various locations. The tracked object may be located when the tag data associated with the tracked object is captured by one of the second A/V recording and communication devices. Further, upon locating a tracked object, the second A/V recording and communication device may capture image data of the tracked object and/or the suspected thief of the tracked object. These and other aspects and advantages of the present embodiments are described in further detail below.

Figure 15:
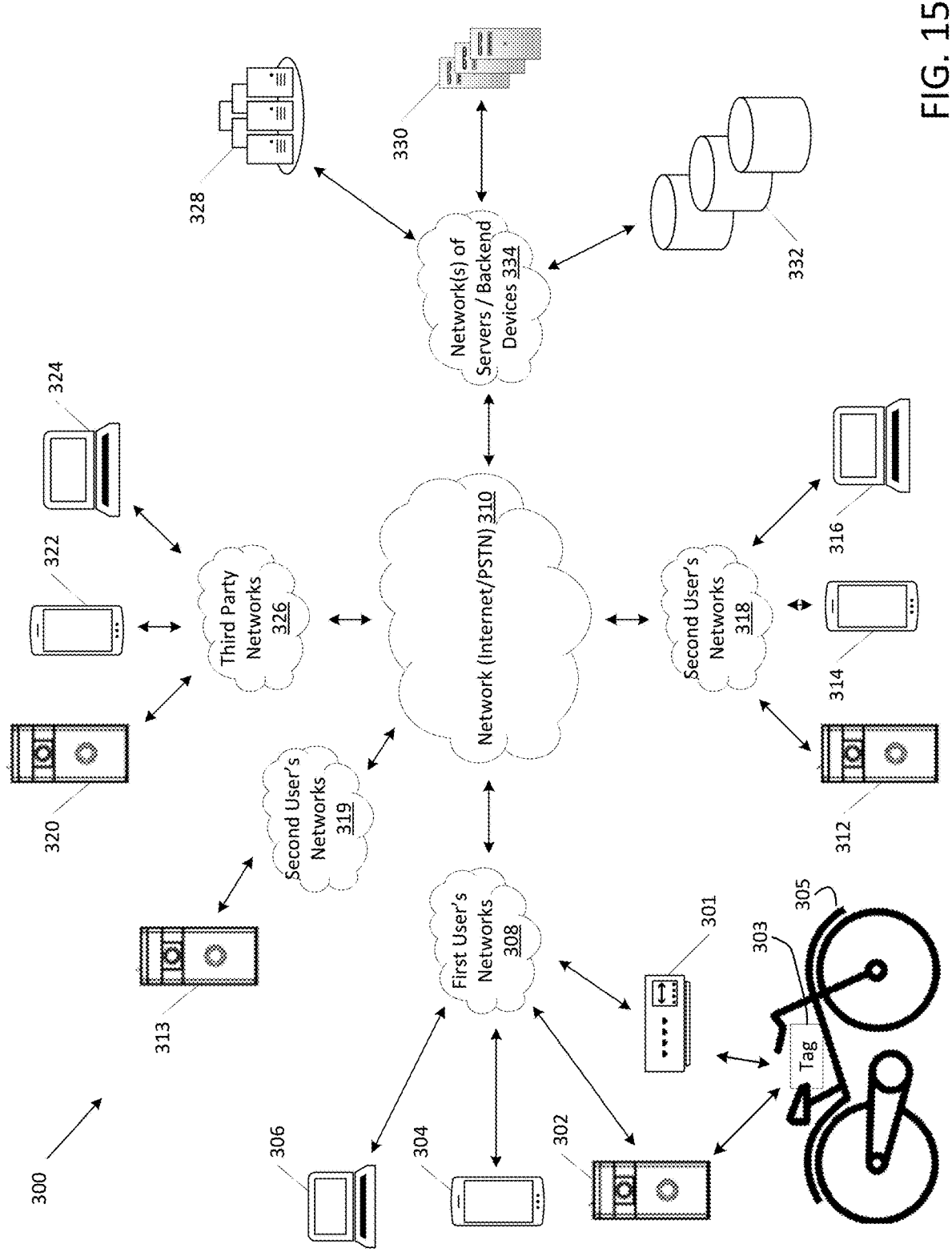
FIG. 15 is a functional block diagram illustrating a system for communicating in a network according to various aspects of the present disclosure.

FIG. 15 is a functional block diagram illustrating a system 300 for communicating in a network for monitoring and locating tracked objects. In many embodiments, an object may be monitored and located using a tag device (may also be referred throughout as a "tag"). In various embodiments, a tracked object may be associated with a tag having a communication module for periodically transmitting tag data compatible for use in an LPWAN. In many embodiments, the tag data may include any data compatible for use in an LPWAN, such as (but not limited to) data compatible with long range, low power wireless technology, such as LoRa® technology developed by Semtech Corporation headquartered in Camarillo, Calif. (may also be referred to as "LoRa data"), or data compatible with any other LPWAN technology, such as SIGFOX, NB IoT, or LTE-M, for example, or any other LPWAN, or similar, technology now known or later developed. As further described below, the smart-home hub device may be configured to receive the tag data and monitor the tracked object using the tag data. In some embodiments, the smart-home hub device may be configured to determine when the tracked object has been removed from a user's premises and alert a client device associated with the smart-home hub device (and/or an A/V recording and communication device). In various embodiments, the smart-home hub device may transmit to a backend device an output signal that includes the tag data and identifies when the tracked object is missing and/or stolen. In many embodiments, the backend devices may transmit a locate object signal that includes the tag data to a plurality of second A/V recording and communication devices located throughout the network. In some embodiments, one of the plurality of second A/V recording and communication devices may locate the tracked object using the tag data, as further described below. Further, upon locating the tracked object, the one of the second A/V recording and communication devices may capture second image data that includes image data of the tracked object and, potentially, image data of a suspected perpetrator.

In reference to FIG. 15, the system 300 may include one or more first audio/video (A/V) recording and communication devices 302 configured to access a first user's network 308 to connect to a network (Internet/PSTN) 310. The system 300 may also include one or more first client devices 304, 306, which in various embodiments may be configured to be in network communication with the first A/V recording and communication device 302. The first client devices 304, 306 may comprise, for example, a mobile phone such as a smartphone, or a computing device such as a tablet computer, a laptop computer, a desktop computer, etc. The first client devices 304, 306 may include any or all of the components and/or functionality of the client device 114 and/or the client device 800 described herein. In some embodiments, the first client devices 304, 306 may not be associated with a first A/V recording and communication device.

The system 300 may further include a smart-home hub device 301. The smart-home hub (also known as a home automation hub) device 301, which is illustrated in further detail in FIG. 16, may comprise any device that facilitates communication with and control of one or more secondary devices and/or the first A/V recording and communication device 302. For example, the smart-home hub may be a component of a home security system and/or a home automation system (may be a combined home security/automation system). Home automation, or smart home, is building automation for the home. It involves the control and automation of various secondary devices and/or systems, such as lighting, heating (such as smart thermostats), ventilation, air conditioning (HVAC), and security, as well as home appliances, such as washers/dryers, ovens, or refrigerators/freezers. Examples of secondary security devices in a smart home security/automation system include door sensors, window sensors, flood sensors, glass break sensors, contact sensors, tilt sensors, temperature sensors, smoke detectors, carbon monoxide detectors, and lock/unlock sensors. Wi-Fi is often used for remote monitoring and control of smart home security/automation devices. Smart home devices, when remotely monitored and controlled via the Internet, may be considered to be components of the Internet of Things. Smart home systems may include switches and/or sensors connected to a central hub, sometimes called a gateway, from which the system may be controlled with a user interface. The user interface may include any or all of a wall-mounted terminal, mobile phone (e.g., smartphone) software, a tablet computer or a web interface, often but not always via Internet cloud services. The home automation system may use one or more communication protocols, including either or both of wired and wireless protocols, including but not limited to X10, Ethernet, RS-485, 6LoWPAN, Bluetooth LE (BLE), ZigBee, and Z-Wave.

The secondary devices may comprise one or more tag device(s) 303 for monitoring and locating one or more tracked object(s) 305, as further described below. In some embodiments, the tag device 303 may communicate directly with the smart-home hub device 301 and/or the first A/V recording and communication device 302 (and/or any other device in the system 300). Alternatively, or in addition, the tag device 303 may communicate with any device in the system 300, including the smart-home hub device 301, through the first user's network 308. The user may control the tag device 303 through the smart-home hub device 301 using either or both of the first client devices 304, 306. For example, the user may set parameters on the tag device 303 using an application executing on the first client device 304, which may be, for example, a smartphone. In some embodiments, the user may control the first A/V recording and communication device 302 through the smart-home hub device 301 using either or both of the first client devices 304, 306.

In various embodiments, the system 300 may also include a plurality of second A/V recording and communication devices 312, 313 connected to the network (Internet/PSTN) 310 using second users' networks 318, 319, respectively, to access the network (Internet/PSTN) 310. The system 300 may further include one or more second client devices 314, 316, which in various embodiments may be configured to be in network communication with a second A/V recording and communication device 312. The second client devices 314, 316 may comprise, for example, a mobile phone such as a smartphone, or a computing device such as a tablet computer, a laptop computer, a desktop computer, etc. The second client devices 314, 316 may include any or all of the components and/or functionality of the client device 114 and/or the client device 800 described herein.

In some embodiments, the second A/V recording and communication device 313 may not be associated with any second client devices. Such a second A/V recording and communication device 313 may comprise, for example, a public or "neighborhood" A/V recording and communication device 313 that records videos that may be accessed by any requesting member of the public, and/or by any requesting member of the neighborhood in which the device 313 is located, and/or by law enforcement.

In some embodiments, the system 300 may also include one or more third party A/V recording and communication devices 320 connected to the network (Internet/PSTN) 310 using various third party networks 326 such as a local network, a wireless network such as a cellular/mobile network and/or a Wi-Fi network, a wired network such as an Ethernet network, a public network, a low-bandwidth network, and/or any other appropriate network to access the network (Internet/PSTN) 310. The system 300 may further include one or more third party client devices 322, 324, which in various embodiments may be configured to be in network communication with the third party A/V recording and communication device 320. The third party client devices 322, 324 may comprise, for example, a mobile phone such as a smartphone, or a computing device such as a tablet computer, a laptop computer, a desktop computer, etc. The third party client devices 322, 324 may include any or all of the components and/or functionality of the client device 114 and/or the client device 800 described herein. In some embodiments, the third party client devices 322, 324 may not be associated with a third party A/V recording and communication device.

Figure 26:
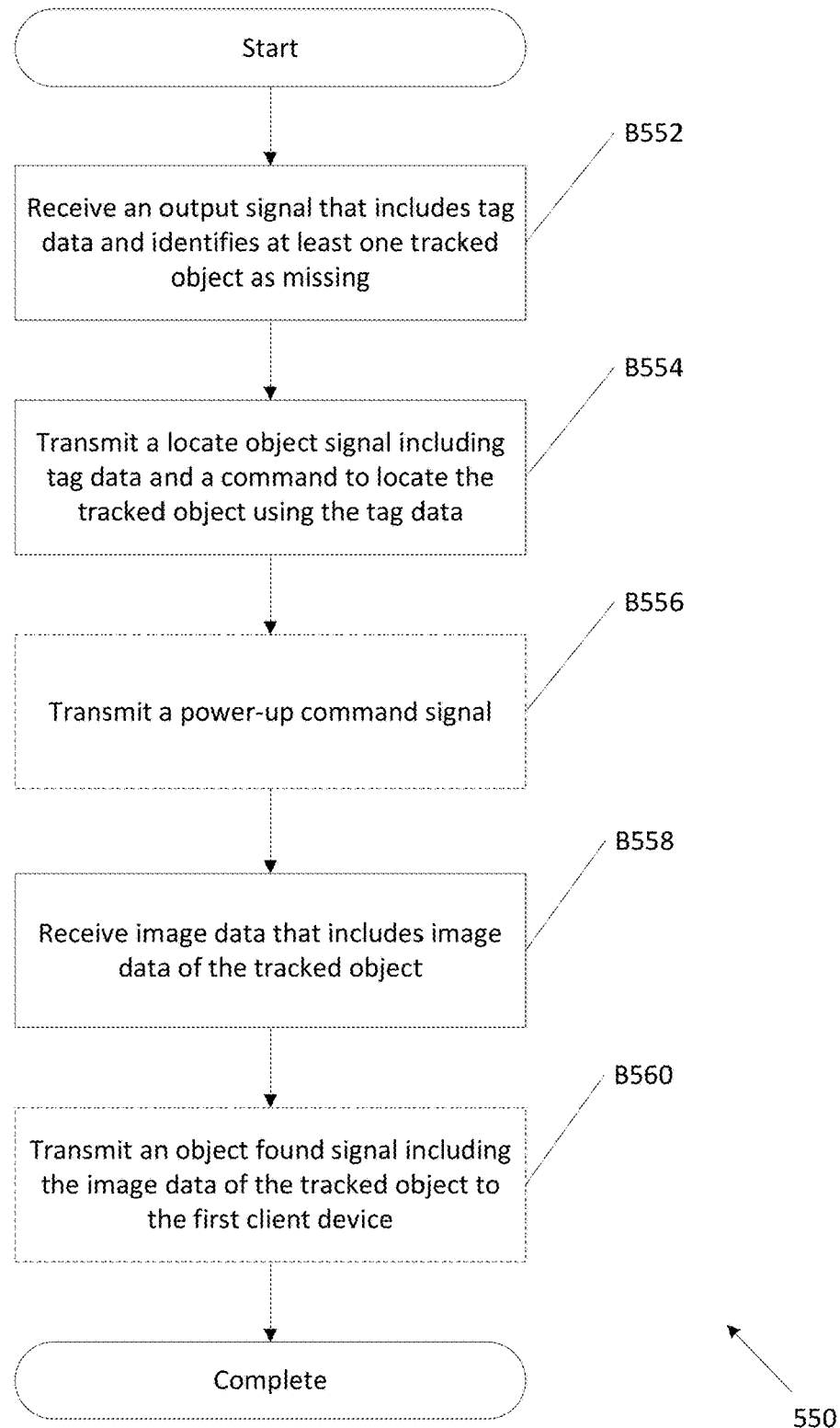
FIG. 26 is a flowchart illustrating one embodiment of a process for monitoring and locating a tracked object according to an aspect of the present disclosure.

With further reference to FIG. 15, the system 300 may also include various backend devices such as (but not limited to) storage devices 332, backend servers 330, and backend APIs 328 in network communication with the first, second, and third party A/V communication devices 302, 312, 313, 320 and their respective client devices 304, 306, 314, 316, 322, 324. In some embodiments, the storage devices 332 may be a separate device from the backend servers 330 (as illustrated) or may be an integral component of the backend servers 330. In addition, the first and second users' networks 308, 318, 319 and the network 310 may be similar in structure and/or function to the user's network 110 and the network 112 (FIG. 1), respectively. In some embodiments, the first and second A/V recording and communication devices 302, 312, 313 may be similar in structure and/or function to the A/V recording and communication device 100 (FIG. 1) and/or the A/V recording and communication doorbell 130 (FIGS. 3-14). In some embodiments, the first user's client devices 304, 306 may be similar in structure and/or function to the user's client device 114 (FIG. 1) and/or the user's client device 800 (FIG. 26). The second users' client devices 314, 316 may also be similar in structure and/or function to the user's client device 114 (FIG. 1) and/or the user's client device 800 (FIG. 26). Also, the storage devices 332 may be similar in structure and/or function to the storage device 116 (FIG. 1). In addition, in some embodiments, the backend servers 330 and backend APIs 328 may be similar in structure and/or function to the server 118 and the backend API 120 (FIG. 1), respectively.

Figure 16:
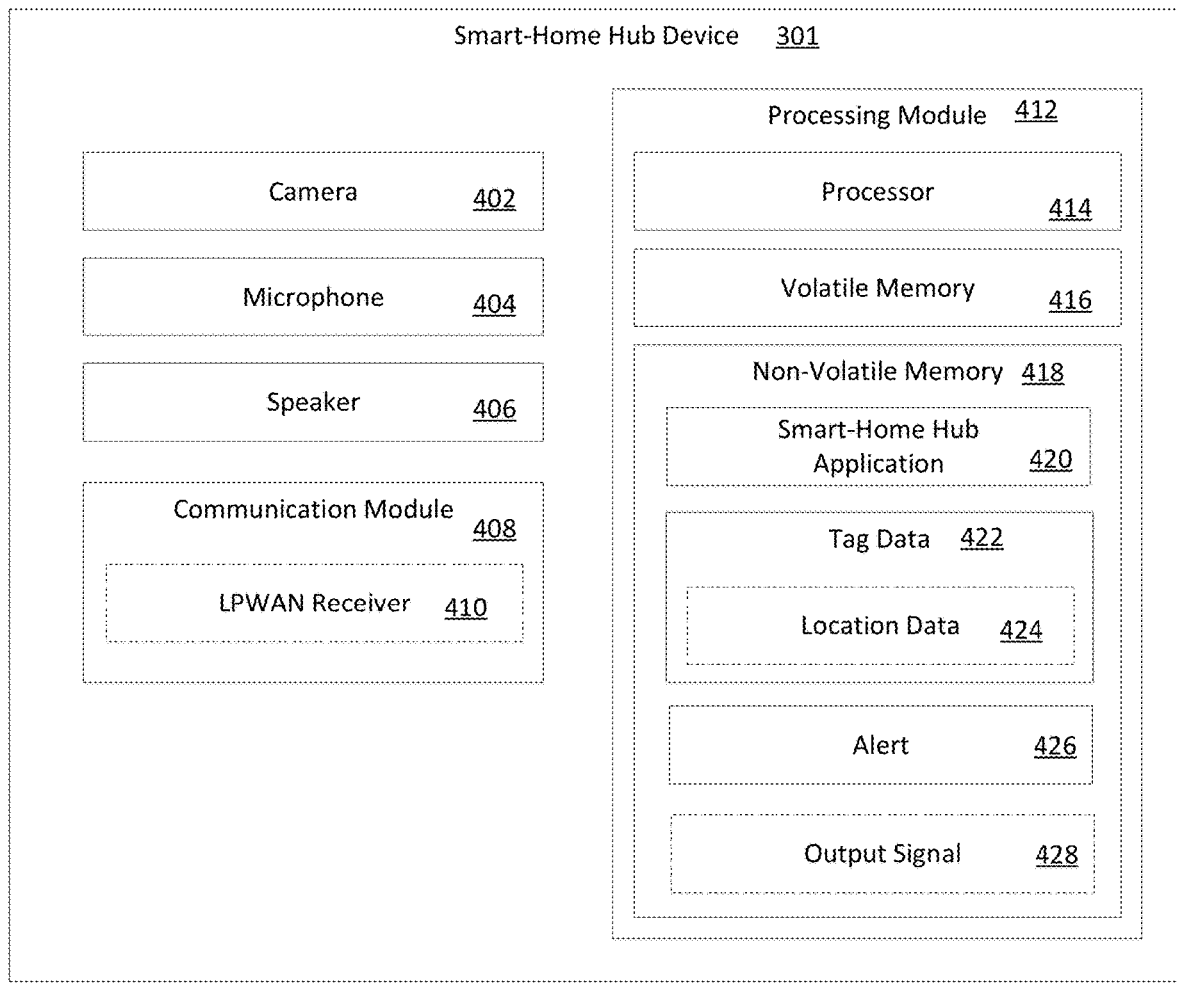
FIG. 16 is a functional block diagram illustrating one embodiment of a smart-home hub device according to various aspects of the present disclosure.

FIG. 16 is a functional block diagram illustrating an embodiment of the smart-home hub device 301 according to various aspects of the present disclosure. The smart-home hub device 301 may comprise a processing module 412 that is operatively connected to a camera 402, a microphone 404, a speaker 406, and a communication module 408. In some embodiments, any or all of the camera 402, the microphone 404, and the speaker 406 may be omitted from the smart-home hub device 301. In addition, the communication module 408 may include an LPWAN-enabled receiver 410 configured to receive tag data 422 from a tag device, as described above. For example, in embodiments where the tag data 422 includes LoRa data, the LPWAN receiver 410 may be configured to receive the LoRa data. The processing module 412 may comprise a processor 414, volatile memory 416, and non-volatile memory 418 that includes a smart-home hub application 420. In various embodiments, the smart-home hub application 420 may configure the processor 414 to associate a tag device 303 having tag data 422 with at least one object to be monitored, as further described below. In some embodiments, the smart-home hub application 420 may further configure the processor 414 to determine when the at least one tracked object 305 has been removed from a premises using the tag data 422, as further described below. In various embodiments, the tag data 422 may include location data 424 that provides data about the current location of the tag device 303, as further described below. In some embodiments, the smart-home hub application 420 may further configure the processor 414 to transmit an alert 426 to a first client device 304, 306 associated with the smart-home hub device 301 and/or the first A/V recording and communication device 302 upon a determination that the at least one tracked object 305 has been removed from the premises, as further described below. Further, the smart-home hub application 420 may also configure the processor 414 to transmit an output signal 428 including the tag data 422 to a backend server 330 for locating the at least one tracked object 305, as further described below.

Figure 17:
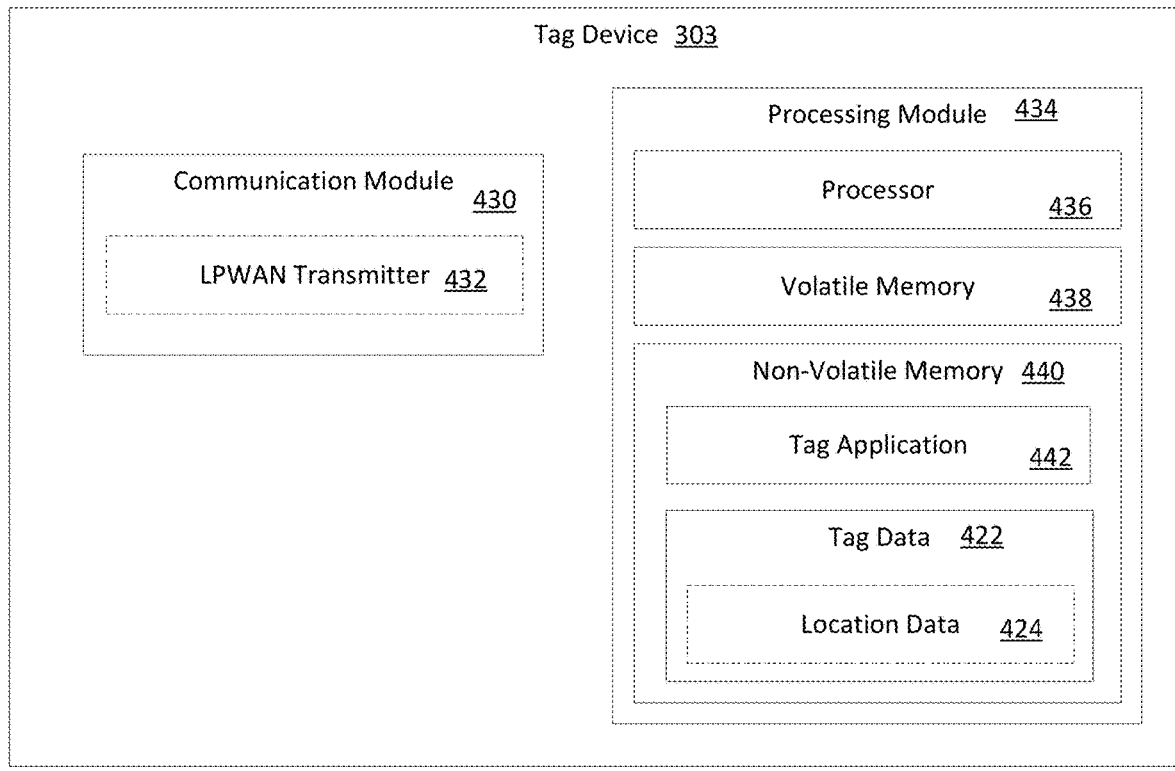
FIG. 17 is a functional block diagram illustrating one embodiment of a tag device according to various aspects of the present disclosure.

FIG. 17 is a functional block diagram illustrating an embodiment of the tag device 303 according to various aspects of the present disclosure. The tag device 303 may comprise a processing module 434 that is operatively connected to a communication module 430. In some embodiments, the communication module 430 may include an LPWAN transmitter 432 configured to transmit data compatible for use in an LPWAN including data compatible with long range, low power wireless technology such as LoRa data, or data compatible with any other LPWAN technology, such as SIGFOX, NB IoT, or LTE-M, as described above. In LoRa embodiments, the tag device 303 may also be a LoRa tracker secured to the tracked object 305. The processing module 434 may comprise a processor 436, volatile memory 438, and non-volatile memory 440 that includes a tag application 442. In various embodiments, the tag device 303 may be associated with an object 305 (FIG. 15) designated to be monitored and located when missing and/or stolen (may also be referred to as "tracked object 305"), as further described below. For example, the tag device 303 may be associated with a tracked object 305 by physically attaching the tag device 303 to the at least one tracked object 305. In some embodiments, the tag device 303 may be placed on, within, or in any manner such that the tag device 303 moves and stays connected to the at least one tracked object 305. Further, the non-volatile memory 440 may also include tag data 422 that may include location data 424 for monitoring and locating tracked objects, as further described below.

Figure 18:
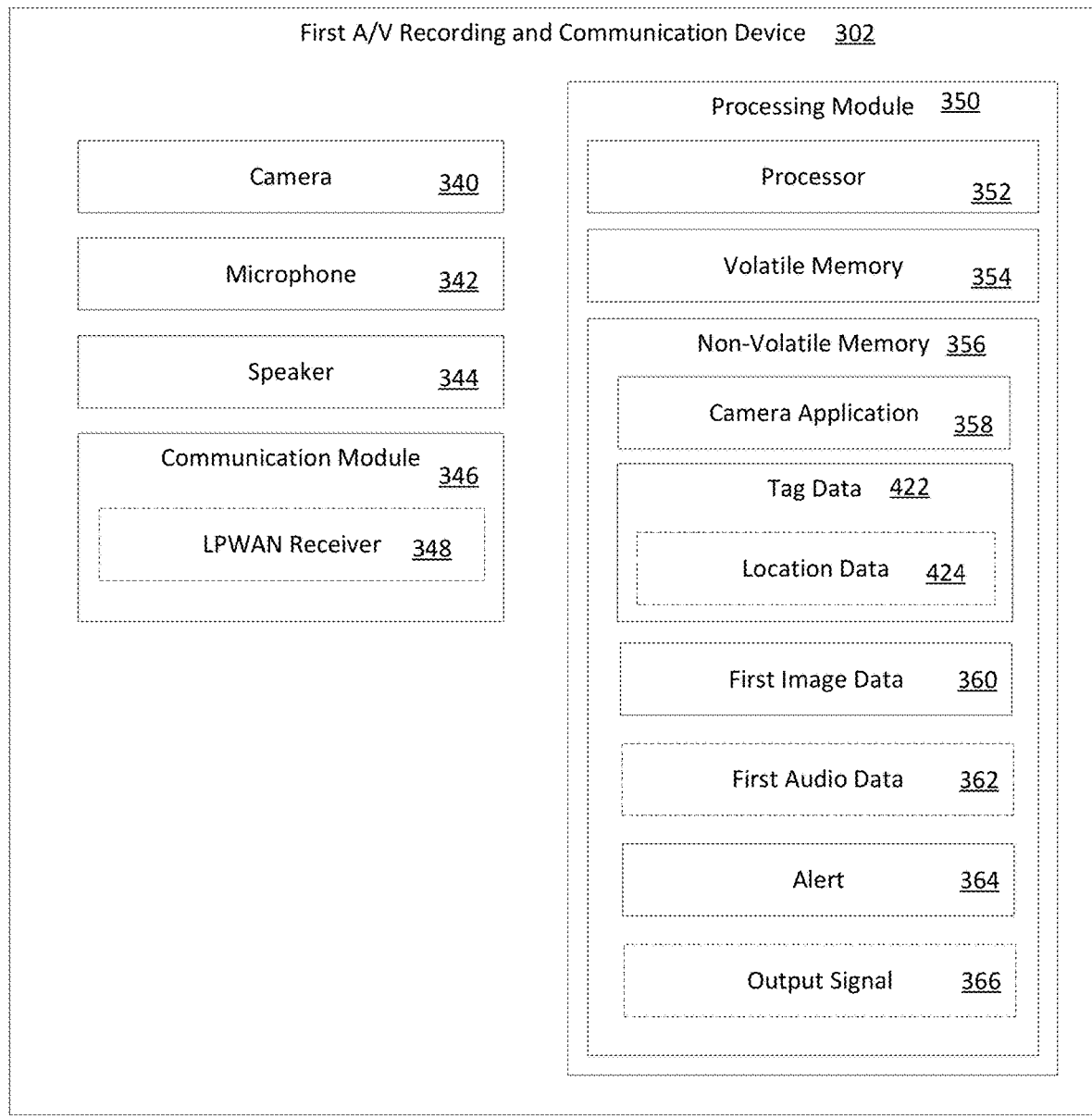
FIG. 18 is a functional block diagram illustrating one embodiment of a first A/V recording and communication device according to various aspects of the present disclosure.

FIG. 18 is a functional block diagram illustrating an embodiment of the first A/V recording and communication device 302 according to various aspects of the present disclosure. The first A/V recording and communication device 302 may comprise a processing module 350 that is operatively connected to a camera 340, a microphone 342, a speaker 344, and a communication module 346. In some embodiments, the communication module 346 may include an LPWAN receiver 348 that may also be operatively connected to the processing module 350.

The processing module 350 may comprise a processor 352, volatile memory 354, and non-volatile memory 356 that includes a camera application 358. The camera application 358 may configure the processor 352 to capture first image data 360 using the camera 340 and first audio data 362 using the microphone 342. In various embodiments, the camera application 358 may configure the processor 352 to associate a tag device 303 having tag data 422 with at least one object to be monitored, as further described below. In some embodiments, the camera application 358 may further configure the processor 352 to determine when the at least one tracked object 305 has been removed from a premises using the tag data 422, as further described. In various embodiments, the tag data 422 may include location data 424 that provides data about the current location of the tag device 303, as further described below. In some embodiments, the camera application 358 may further configure the processor 352 to transmit an alert 364 to a first client device 304, 306 associated with the first A/V recording and communication device 302 upon a determination that the at least one tracked object 305 has been removed from the premises, as further described below. In some embodiments, the camera application 358 may further configure the processor 352 to transmit an output signal 366 including the tag data 422 to a backend server 330 for locating the at least one tracked object 305, as further described below.

Figure 19:
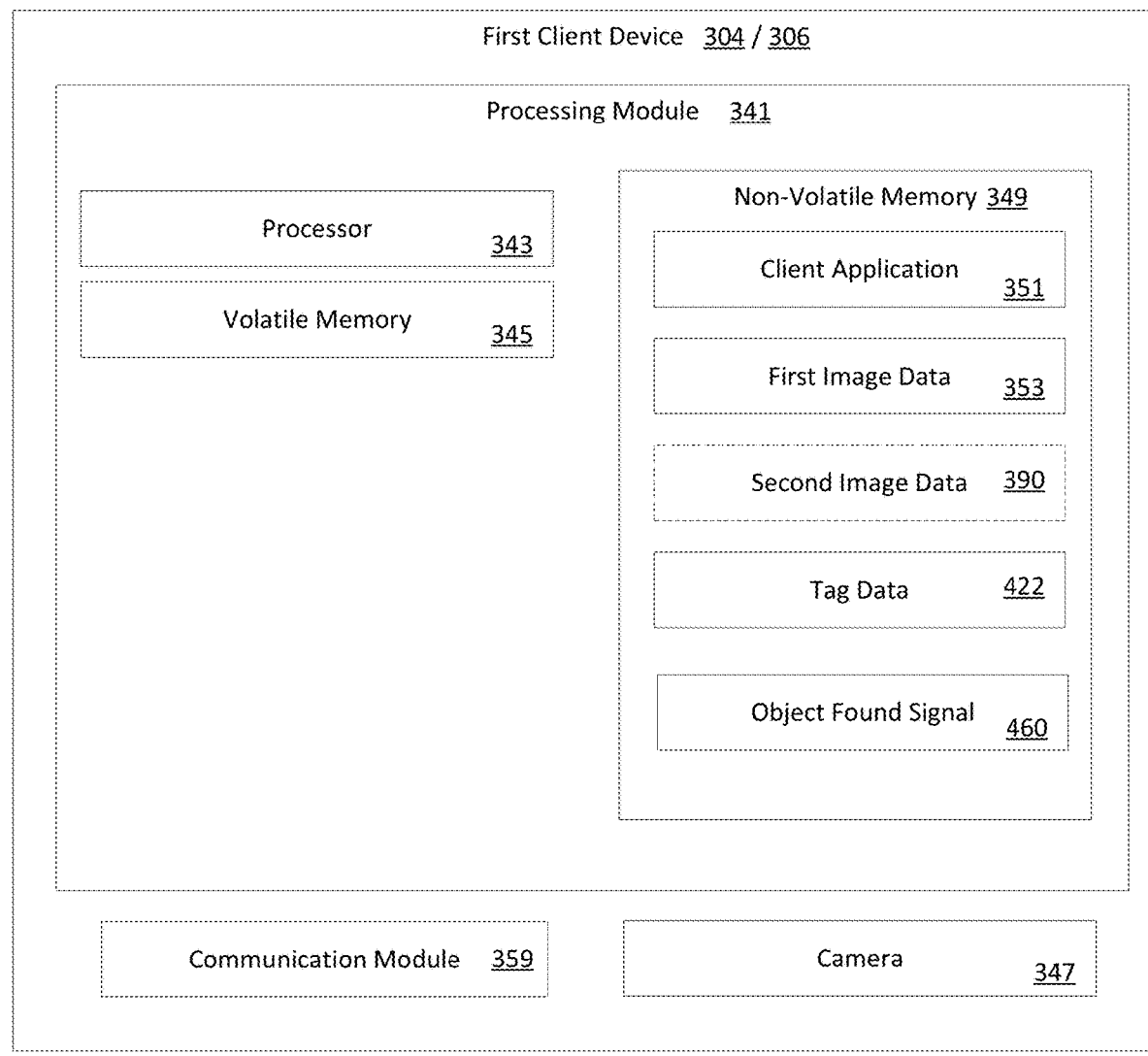
FIG. 19 is a functional block diagram illustrating one embodiment of a first client device according to various aspects of the present disclosure.

FIG. 19 is a functional block diagram illustrating an embodiment of the first client device(s) 304, 306 according to various aspects of the present disclosure. The first client device(s) 304, 306 may include a processing module 341 that is operatively connected to a camera 347. The processing module 341 may comprise a processor 343, volatile memory 345, and non-volatile memory 349. The non-volatile memory 349 may include a client application 351 that configures the processor 343 to capture first image data 353 using the camera 347, where the first image data 353 includes image data of an object designated to be tracked and located when missing. The first client device(s) 304, 306 may also include a communication module 359 for network communication with the first A/V recording and communication device 302 and/or the backend server 330. In some embodiments, the first client device(s) 304, 306 may receive the second image data 390 captured by the second A/V recording and communication device 312, 313, as described below.

In further reference to FIG. 19, various objects may be designated for tracking and location when missing using the first client device(s) 304, 306. For example, the client application 351 may present to a user on a display of the first client device(s) 304, 306 a video and/or a still photo that contains one or more objects and receives an input from the user selecting an object to be tracked. In various embodiments, the tracked objects may include inanimate objects and/or animate objects, such as a person or a pet. In some embodiments, the user may designate the tracked object 305 by selecting an object from the first image data 353 captured using the camera 347. Further, the user may designate the tracked object 305 by selecting an object from the first image data 360 captured using the camera 340 of the first A/V recording and communication device 302. In either embodiment, the tracked object 305 may also be associated with the tag data 364, as further described below.

Figure 20:
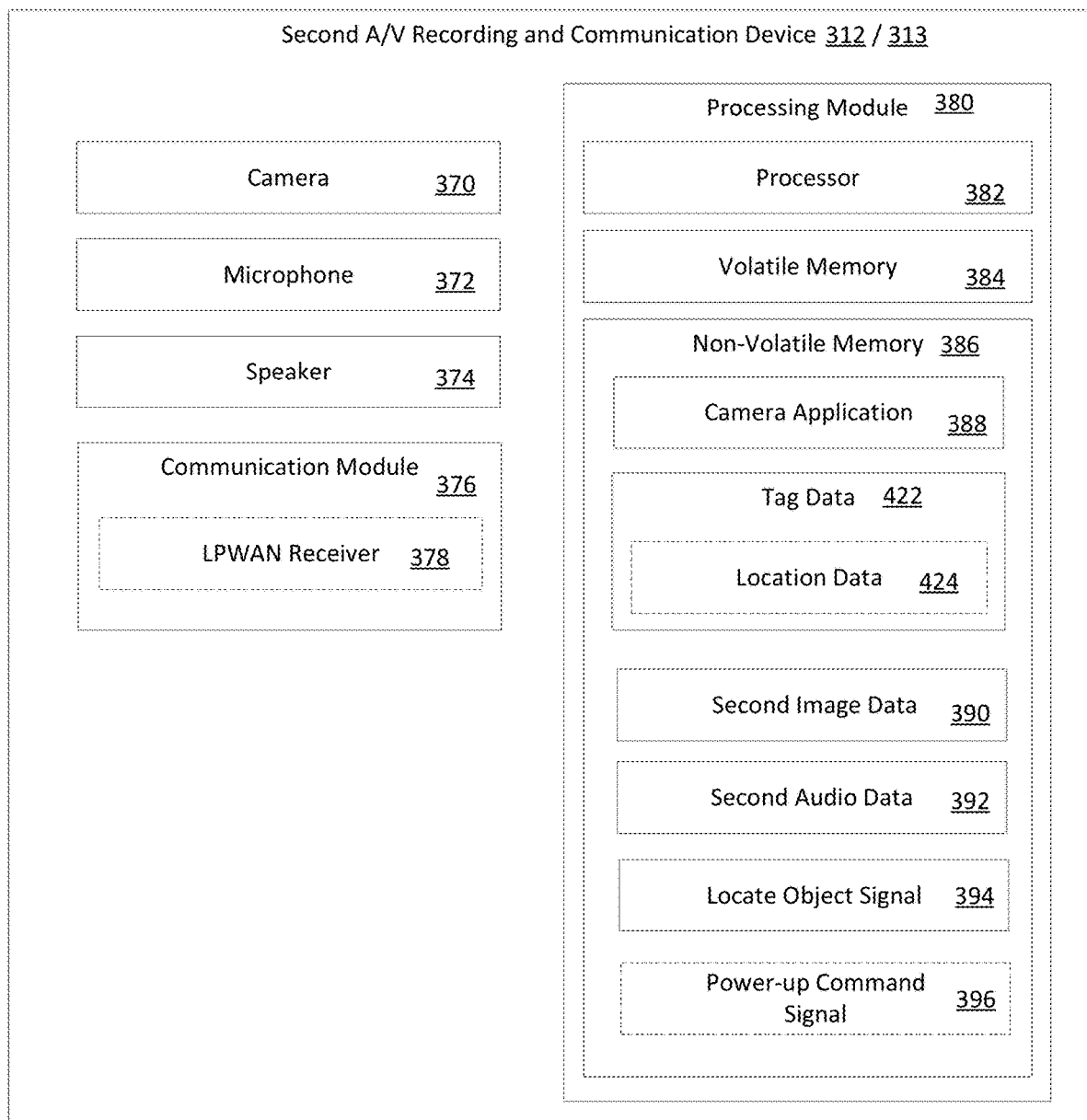
FIG. 20 is a functional block diagram illustrating one embodiment of a second A/V recording and communication device according to various aspects of the present disclosure.

FIG. 20 is a functional block diagram illustrating an embodiment of the second A/V recording and communication device(s) 312, 313 according to various aspects of the present disclosure. The second A/V recording and communication device(s) 312, 313 may comprise a processing module 380 that is operatively connected to a camera 370, a microphone 372, a speaker 374, and a communication module 376. In some embodiments, the processing module 380 may also be operatively connected to an LPWAN receiver 378. The processing module 380 may comprise a processor 382, volatile memory 384, and non-volatile memory 386 that includes a camera application 388. The camera application 388 may configure the processor 382 to capture second image data 390 using the camera 370 and second audio data 392 using the microphone 372. In various embodiments, the camera application 388 may also configure the processor 382 to transmit the second image data 390 and/or the second audio data 392 to the backend server 330, using the communication module 376. In some embodiments, the backend server 330 may locate a tracked object 305 using a locate object signal 394 that includes tag data 422 and a command to locate the tracked object 305 using the tag data 422, as further described below. Further, the second A/V recording and communication device(s) 312, 313 may also receive a power-up command signal 396 that configures the LPWAN receiver 378 to power up from a low-power mode to a powered-on mode to capture the tag data 422 and/or configures the camera 370 to power up from a low-power mode to a powered-on mode to capture second image data 390. In some embodiments, the locate object signal 394 and the power-up command signal 396 may be combined and received as a single signal from the backend server 330.

In reference to FIGS. 19 and 20, the image data 360, 390 may comprise image sensor data such as (but not limited to) exposure values and data regarding pixel values for a particular sized grid. Further, image data may comprise converted image sensor data for standard image file formats such as (but not limited to) JPEG, JPEG 2000, TIFF, BMP, or PNG. In addition, image data may also comprise data related to video, where such data may include (but is not limited to) image sequences, frame rates, and the like. Moreover, image data may include data that is analog, digital, uncompressed, compressed, and/or in vector formats. Image data may take on various forms and formats as appropriate to the requirements of a specific application in accordance with the present embodiments. As described herein, the term "record" may also be referred to as "capture" as appropriate to the requirements of a specific application in accordance with the present embodiments.

Figure 21:
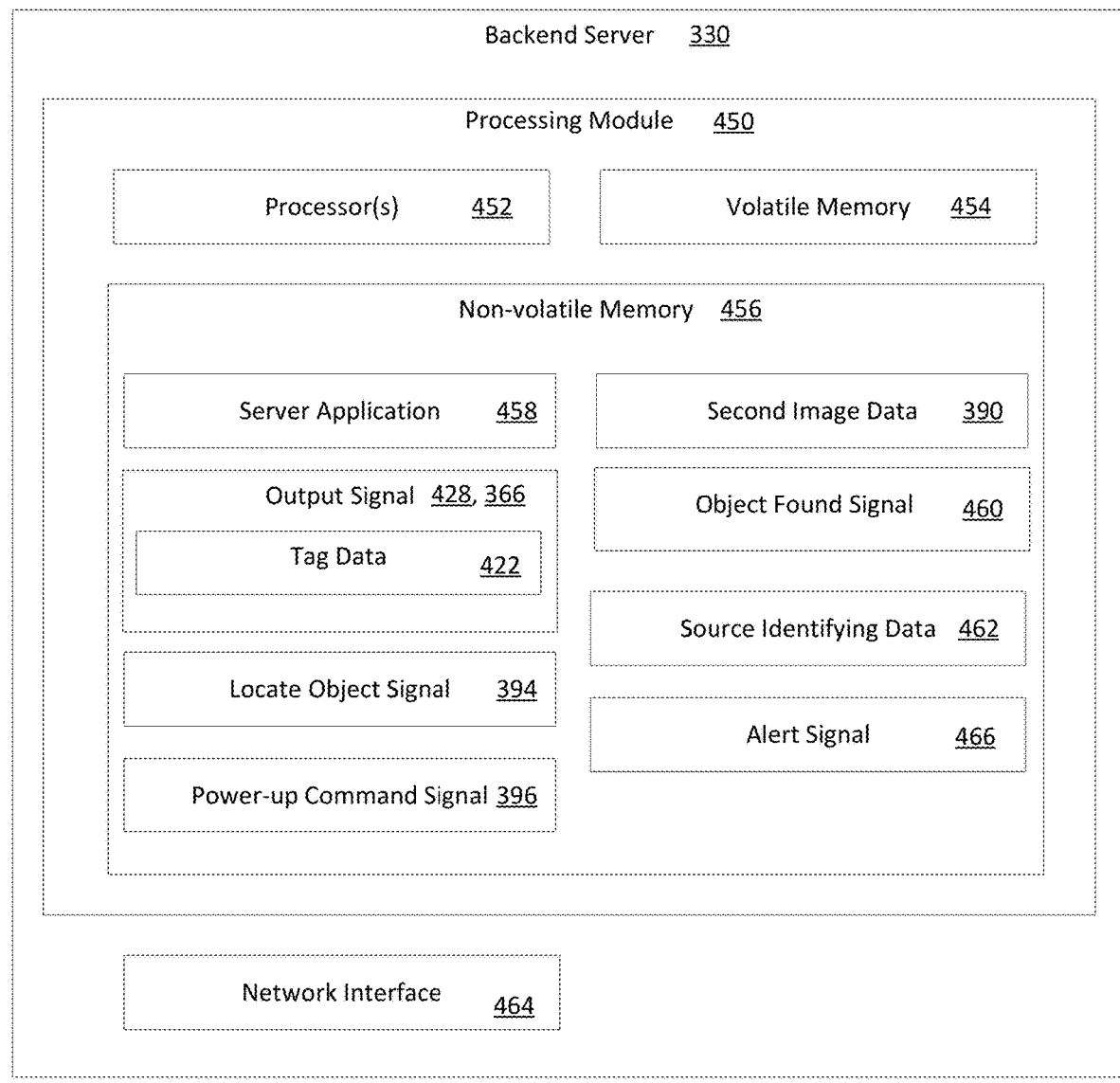
FIG. 21 is a functional block diagram illustrating one embodiment of a backend device according to various aspects of the present disclosure.

FIG. 21 is a functional block diagram illustrating one embodiment of a backend server 330 according to various aspects of the present disclosure. The backend server 330 may comprise a processing module 450 including a processor 452, volatile memory 454, non-volatile memory 456, and a network interface 464. The network interface 464 may allow the backend server 330 to access and communicate with devices connected to the network (Internet/PSTN) 310. For example, the backend server 330 may receive an output signal 428, 366 from a smart-home hub device 301 and/or a first A/V recording and communication device 302, respectively. In various embodiments, the output signal 428, 366 may include tag data 422 for locating a tracked object 305 removed and/or stolen from a premises, as further described below.

In reference to FIG. 21, the non-volatile memory 456 may include a server application 458 that configures the processor 452 to locate tracked objects, as further described below. In many embodiments, the backend server 330 may receive an output signal 428 from the smart-home hub device 301 that identifies a tracked object 305 as missing. In other embodiments, the backend server 330 may receive an output signal 366 from the first A/V recording and communication device 302 that identifies a tracked object 305 as missing. In some embodiments, the backend server 330 may locate the tracked object 305 by transmitting a locate object signal 394 to a plurality of second A/V recording and communication devices 312, 313, where the locate object signal 394 may include the tag data 422 and a command to locate the tracked object 305 using the tag data 422, as further described below. Upon locating the tracked object 305 using the tag data 422, one of the plurality of second A/V recording and communication device(s) 312, 313 may capture second image data 390 of the tracked object 305. In some embodiments, the backend server 330 may also generate and transmit a power-up command signal 396 to the one of the plurality of second A/V recording and communication devices 312, 313 to power up the LPWAN receiver 378 to capture the tag data 422 and/or to power up the camera 370 to capture the second image data 390, as further described below. In many embodiments, the backend server 330 may also generate and transmit an object found signal 460 to the first client device(s) 304, 306, where the object found signal 460 may comprise the second image data 390 that includes the image data of the tracked object 305 and/or the location data 424 that indicates the location of the tracked object 305.

In further reference to FIG. 21, the non-volatile memory 406 may also include source identifying data 462 that may be used to determine locations of the first A/V recording and communication device 302, the second A/V recording and communication device(s) 312, 313, and/or the third party A/V recording and communication device 320. In addition, the source identifying data 462 may be used to determine locations of the first client devices 304, 306, the second client devices 314, 316, and/or the third party client devices 322, 324. In some embodiments, the backend server 330 may generate and transmit an alert signal 466 that may include image data of the tracked object 305, and/or a suspected perpetrator, and/or possible locations of the tracked object 305, to a third party client device 322, 324 and/or a law enforcement agency, as further described below.

In the illustrated embodiment of FIGS. 16-21, the various components including (but not limited to) the processing modules 412, 434, 350, 341, 380, the communication modules 408, 430, 346, 359, 376, and the network interface 464 are represented by separate boxes. The graphical representations depicted in each of FIGS. 16-21 are, however, merely examples, and are not intended to indicate that any of the various components of the smart-home hub device 301, tag device 303, first A/V recording and communication device 302, the second A/V recording and communication device(s) 312, 313, or the backend server 330 are necessarily physically separate from one another, although in some embodiments they might be. In other embodiments, however, the structure and/or functionality of any or all of the components of the smart-home hub device 301 may be combined. In some embodiments, the communication module 376 may include its own processor, volatile memory, and/or non-volatile memory. Likewise, the structure and/or functionality of any or all of the components of the tag device 303 may be combined. In some embodiments, the communication module 430 may include its own processor, volatile memory, and/or non-volatile memory. In addition, the structure and/or functionality of any or all of the components of first A/V recording and communication device 302 may be combined. In some embodiments the communication module 346 may include its own processor, volatile memory, and/or non-volatile memory. In addition, the structure and/or functionality of any or all of the components of first client device(s) 304, 306 may be combined. In some embodiments, the communication module 359 may include its own processor, volatile memory, and/or non-volatile memory. Further, the structure and/or functionality of any or all of the components of the second A/V recording and communication device(s) 312, 313 may be combined. In addition, in some embodiments the communication module 376 may include its own processor, volatile memory, and/or non-volatile memory. Moreover, the structure and/or functionality of any or all of the components of the backend server 330 may be combined. In addition, in some embodiments the network interface 464 may include its own processor, volatile memory, and/or non-volatile memory.

In further reference to FIGS. 16-21, a communication module, such as the communication modules 408, 430, 346, 359, 376 may comprise (but is not limited to) one or more transceivers and/or wireless antennas (not shown) configured to transmit and receive wireless signals. In further embodiments, the communication modules 408, 430, 346, 376 may comprise (but are not limited to) one or more transceivers configured to transmit and receive wired and/or wireless signals. In addition, the communication modules 408, 346, 376 may include LPWAN receivers 410, 348, 378, and the communication module 430 may include an LPWAN transmitter 432, as described above. In various embodiments, LPWAN receivers and/or transmitters, such as the LPWAN receivers 410, 348, 378 and LPWAN transmitter 432, may comprise (but are not limited to) one or more transceivers and/or wireless antennas (not shown) configured to transmit and receive data compatible for use in an LPWAN, as described above.

Figure 22:
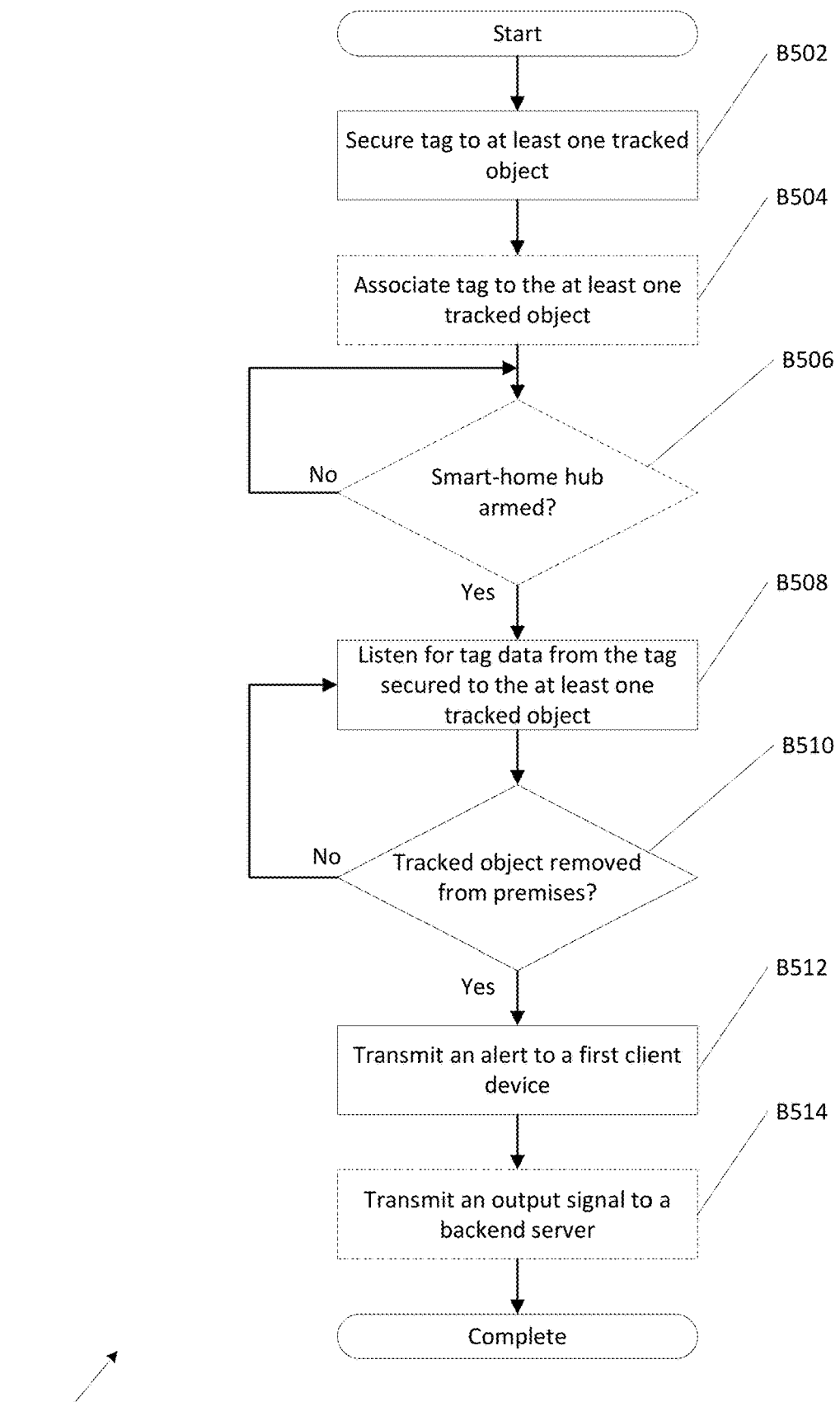
FIG. 22 is a flowchart illustrating one embodiment of a process for monitoring an object on a premises according to an aspect of the present disclosure.

FIG. 22 is a flowchart illustrating one embodiment of a process 500 for monitoring an object on a premises according to an aspect of the present disclosure. In various embodiments, the tracked object 305 may be an inanimate object, such as (but not limited to) a vehicle, a bicycle, a wallet, and/or any other personal belonging(s). However, in other embodiments, the tracked object 305 may be an animate object, such as a child or a pet. In many embodiments, a premises may be equipped with a smart-home hub device 301, as described above. Further, a tag device 303 may be placed on or attached to at least one object, allowing a user to monitor and locate the tracked object 305, as further described below. In many embodiments, the tag device 303 may be configured for use as part of an LPWAN that allows the tag device 303 to have a relatively long range, allowing the tag device 303 to transmit tag data 422 that may be received even when the tag device 303 has traveled beyond a perimeter of the premises.

In reference to FIG. 22, the process 500 may include securing (block B502) a tag 303 to at least one object to be tracked. In some embodiments, the tag 303 may be secured directly to the at least one tracked object 305 using any attaching mechanism. For example, the tag 303 may be secured to the at least one tracked object 305 using an adhesive, a strap, a clip, magnets, glue, etc. In other embodiments, the tag 303 may be secured to the at least one tracked object 305 by placing the tag 303 on the at least one tracked object 305 or on an item that is attached to and/or covering the tracked object. The process 500 may also include associating (block B504) the tag 303 with the at least one tracked object 305. In various embodiments, the tag 303 may have tag data 422 that includes a unique identifier that may be associated (block B504) with a particular tracked object 305. In some embodiments, the first user may associate (block B504) the tag 303 to the tracked object 305 using the smart-home hub device 301. In some embodiments, a first user may associate (block B504) the tag 303 to the tracked object 305 using first client device(s) 304, 306. In various embodiments, the association of the tag 303 to the at least one tracked object 305 may be stored in the non-volatile memory 418 at the smart-home hub device 301. In some embodiments, the association of the tag 303 to the at least one tracked object 305 may be stored in a non-volatile memory 456 of the backend server 330.

In some embodiments, the process 500 may further include determining (block B506) whether the smart-home hub device 301 is armed. In various embodiments, the smart-home hub device 301 may have two or more settings or states, which states may depend, at least in part, on whether the first user is on the premises or not. For example, when the first user is on the premises, the smart-home hub device 301 may be disarmed, or may be in an armed-stay state (may also be referred to as "armed-home"). When the first user is not on the premises, the smart-home hub device 301 may be in an armed-away state. In further reference to the process 500, if the smart-home hub device 301 is not armed (block B506) the process 500 may not proceed any further until the smart-home hub device 301 is armed. If, however, the smart-home hub device 301 is armed (block B506), then the process 500 may proceed to block B508, which is described below. In other embodiments, the process 500 may continue regardless of the armed/disarmed state of the smart-home hub device 301. In other words, block B506 may be omitted from some embodiments.

In further reference to the process 500, the smart-home hub device 301 may listen (block B508) for tag data 422 transmitted by the tag 303 secured to the at least one tracked object 305. As described above, the tag 303 may include a communication module 430 having an LPWAN transmitter 432 for transmitting the tag data 422. Further, the smart-home hub device 301 may include a communication module 408 having an LPWAN receiver 410 for listening (block B508) for the tag data 422 by receiving the tag data 422 transmitted by the tag 303. In some embodiments, the tag 303 may be configured to transmit the tag data 422 using chirp spread spectrum (CSS) modulation techniques and the smart-home hub device 301 may be configured to receive (block B508) the tag data 422 using CSS demodulation techniques. In some embodiments, the tag data may be LoRa data where the tag 303 may be a LoRa tracker configured to transmit the LoRa data. In such embodiments, the smart-home hub device 301 may be configured to receive (block B508) LoRa data. In other embodiments, the tag 303 may be configured to transmit the tag data 422 using ultra narrow-band (UNB) modulation techniques and the smart-home hub device 301 may be configured to receive (block B508) the tag data 422 using UNB demodulation techniques.

In further reference to FIG. 22, the process 500 may further include determining (block B510) whether the at least one tracked object 305 has been removed from the premises using the tag data 422, as further described below. If the at least one tracked object 305 has not been removed (block B510), then the process 500 may continue to listen (block B508) for tag data 422 from the tag 303 secured to the at least one tracked object 305. However, if the tracked object 305 has been removed from the premises (block B508), then the smart-home hub device 301 may generate and transmit (block B512) an alert 426 to the first client device(s) 304, 306 associated with the smart-home hub device 301 and/or the first A/V recording and communication device 302. The alert 426 may comprise a notification that the at least one tracked object 305 has been removed from the premises. In some embodiments, the process 500 may also include the smart-home hub device 301 generating and transmitting (block B514) an output signal 428 to the backend server 330, wherein the output signal 428 includes the tag data 422 and identifies the at least one tracked object 305 as missing.

Figure 23:
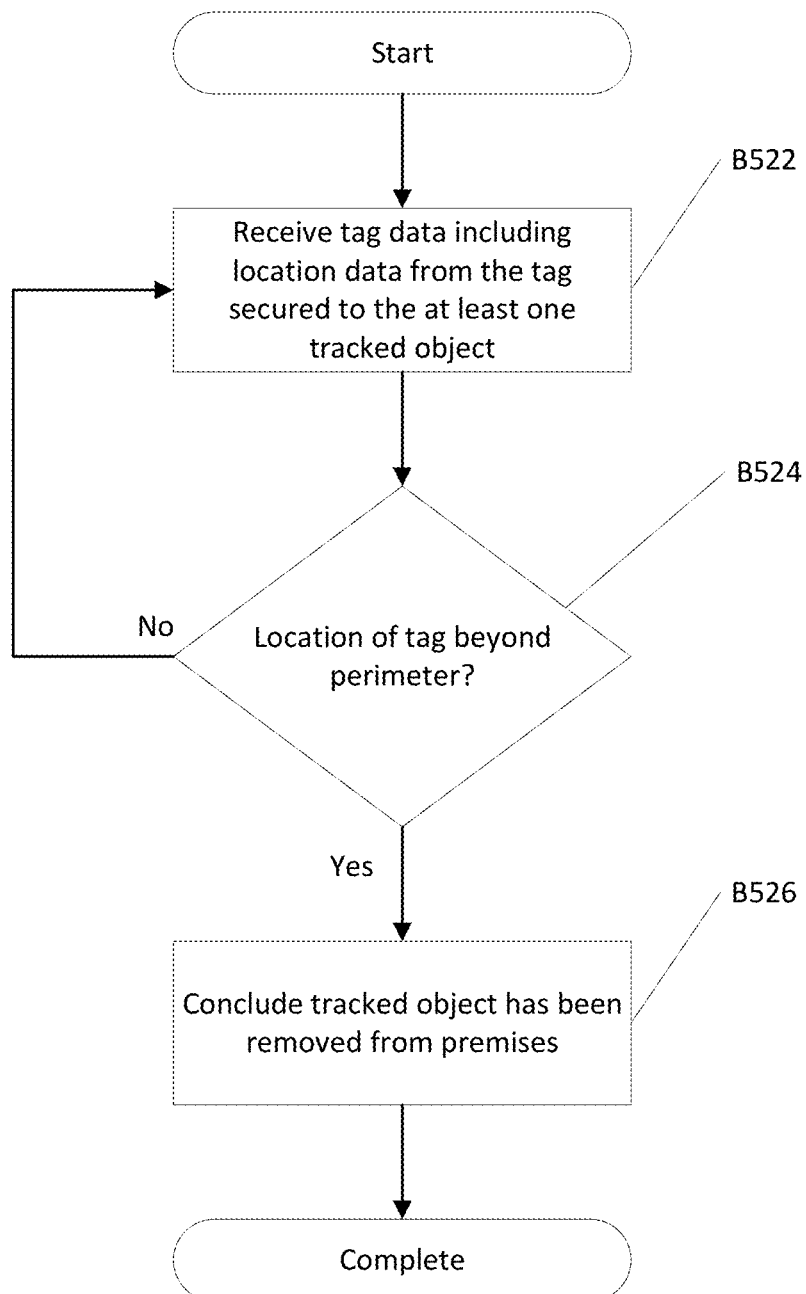
FIGS. 23-25 are flowcharts illustrating embodiments of processes for determining whether a tracked object has been removed from a premises according to various aspects of the present disclosure.

FIG. 23 is a flowchart illustrating one embodiment of a process 520 for determining (block B510, FIG. 22) whether a tracked object has been removed from a premises according to an aspect of the present disclosure. The process 520 may include the smart-home hub device 301 receiving (block B522) tag data 422 that includes location data 424 from the tag 303 secured to the at least one tracked object 305. In various embodiments, the location data 424 may include (but is not limited to) GPS signals, data from various device sensors of the tag device 303, Wi-Fi access points, and cell tower IDs that can be used to derive or estimate the current location of the tag 303. The process 520 may further include determining (block B524) if the location of the tag 303 is beyond a perimeter of the premises. In some embodiments, the perimeter of the premises may be set by the first user using the first client device(s) 304, 306 and/or the smart-home hub device 301. In some embodiments, the perimeter may be set by default to a particular size and shape. In other embodiments, the perimeter may be set based on the at least one tracked object 305 where the perimeter shape and size may be dependent on the particular tracked object 305. If the location of the tag 303 is not beyond (block B524) the perimeter, then the process 520 may continue to receive (block B522) tag data 422 including location data 424 from the tag 303 secured to the at least one tracked object 305. However, if the location of the tag 303 is beyond (block B524) the perimeter, then the process 520 may conclude (block B526) that the tracked object 305 has been removed from the premises (block B510). Of course, even if the process 520 advances to block B526, the process 520 may continue to receive (block B522) tag data 422 including location data 424 from the tag 303 secured to the at least one tracked object 305, at least until the tag 303 moves out of communication range with respect to the smart-home hub device 301.

Figure 24:
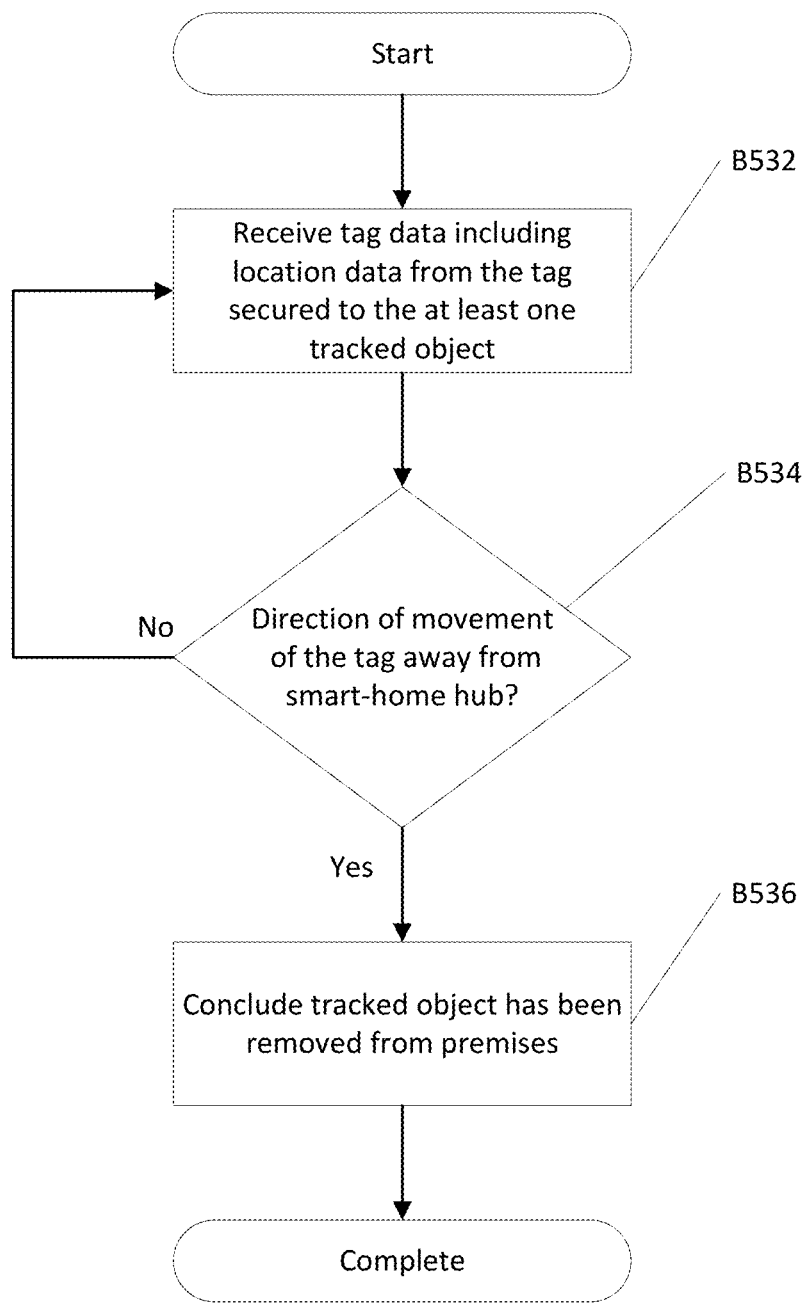

FIG. 24 is a flowchart illustrating another embodiment of a process 530 for determining (block B510, FIG. 22) whether a tracked object has been removed from a premises according to an aspect of the present disclosure. The process 530 may include the smart-home hub device 301 receiving (block B532) tag data 422 that includes location data 424 from the tag 303 secured to the at least one tracked object 305. In various embodiments, the location data 424 may be used to derive or estimate a location of the tag 303 at a first time and at subsequent times. Based on the location of the tag 303 at various times, the direction of movement of the tag 303 can be ascertained. The process 530 may further include determining (block B534) if the direction of movement of the tag 303 is away from the smart-home hub device 301. If the tag 303 is not moving away from the smart-home hub device 301 (block B534), then the process 530 may continue to receive (block B532) tag data 422 including location data 424 from the tag 303 secured to the at least one tracked object 305. However, if the tag 303 is moving away from the smart-home hub device 301 (block B534), then the process 530 may conclude (block B536) that the tracked object 305 has been removed from the premises (block B510). In some embodiments, the direction of movement of the tag may be referenced based on any location such as the first A/V recording and communication device 302 or any other known stationary location. Further, in some embodiments, the direction of movement may have to reach some threshold amount of movement before determining (block B534) that the direction of movement of the tag 303 is or is not away from the smart-home hub device 301. Of course, even if the process 530 advances to block B536, the process 530 may continue to receive (block B532) tag data 422 including location data 424 from the tag 303 secured to the at least one tracked object 305, at least until the tag 303 moves out of communication range with respect to the smart-home hub device 301.

Figure 25:
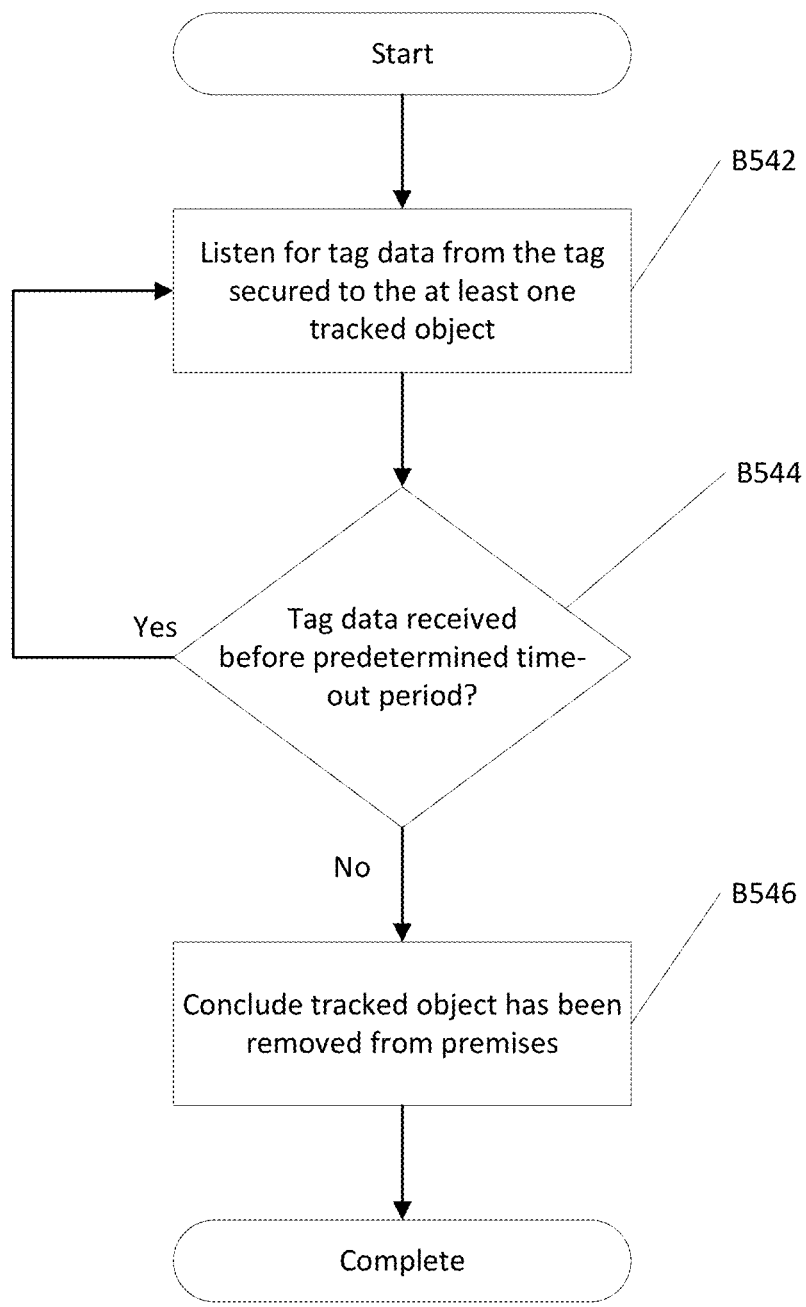

FIG. 25 is a flowchart illustrating another embodiment of a process 540 for determining (block B510, FIG. 22) whether a tracked object has been removed from a premises according to an aspect of the present disclosure. The process 540 may include the smart-home hub device 301 listening (block B542) for tag data 422 from the tag 303 secured to the at least one tracked object 305. The process 540 may further include waiting (block B544) for a predetermined time-out period to receive the tag data 422. If the tag data 422 is received within the predetermined time-out period (block B544), then the process 540 may continue to listen (block B542) for the tag data 422 from the tag 303 secured to the at least one tracked object 305. However, if the tag data 422 is not received within the predetermined time-out period (block B544), then the process 540 may conclude (block B546) that the tracked object 305 has been removed from the premises (block B510). In some embodiments, the predetermined time-out period may be any length of time. In various embodiments, the predetermined time-out period may be set by the first user using the first client device(s) 304, 306 and/or the smart-home hub device 301. In some embodiments, the predetermined time-out period may be set by default to a particular length. In further embodiments, the predetermined time-out period may be dependent on the particular tracked object 305.

FIG. 26 is a flowchart illustrating one embodiment of a process 550 for monitoring and locating a tracked object according to an aspect of the present disclosure. The process 550 may include receiving (block B552) from the smart-home hub device 301 an output signal 428 that includes the tag data 422 and identifies at least one the tracked object 305 as missing. In other embodiments, the process 550 may include receiving (block B552), from the first A/V recording and communication device 302 an output signal 366 that includes the tag data 422 and identifies at least one the tracked object 305 as missing. Upon receiving (block B552) the output signal 428, 366, the process 550 may include transmitting (block B554) a locate object signal 394 from the backend server 330 to a plurality of second A/V recording and communication devices 312, 313. In various embodiments, the locate object signal 394 may include the tag data 422 and a command to locate the tracked object 305 using the tag data 422. For example, in embodiments where the tag data 422 includes LoRa data, at least some of the plurality of second A/V recording and communication devices 312, 313 may include a communication module 376 including an LPWAN receiver 378 configured to receive LoRa data. In various embodiments, the tag 303, such as a LoRa tracker, secured to the at least one tracked object 305 may periodically transmit a signal received by the communication module 376. In various embodiments, the transmitted signal from the tag 303, such as the LoRa tracker, may include a variety of data including (but not limited to) location data 424 that may be used to derive and/or determine the current location of the tag 303 and thus the tracked object 305. The tracked object 305 may be located when one of the plurality of second A/V recording and communication devices 312, 313 captures LoRa data (or has LoRa data stored) that matches the LoRa data associated with the tracked object 305.

In further reference to FIG. 26, the one of the plurality of second A/V recording and communication devices 312, 313 may capture second image data 390 using the camera 370 upon locating the tracked object 305. In some embodiments, the backend server 330 may transmit (block B556) a power-up command signal 396 to one of the plurality of second A/V recording and communication devices 312, 313, wherein the power-up command signal 396 configures the one of the plurality of second A/V recording and communication devices 312, 313 to power up the LPWAN receiver 378 to capture the tag data 422 and/or to power up the camera 370 to capture second image data 390 that includes image data of the tracked object 305. The process 550 may include receiving (block B558) the second image data 390 that includes image data of the tracked object 305, from one of the plurality of second A/V recording and communication devices 312, 313. In addition, the process 550 may also include generating and transmitting (block B560) an object found signal 460 to the first client device(s) 304, 306. In some embodiments, the object found signal 460 may include the second image data 390 that includes the image data of the tracked object 305, and/or the location data 424 that includes the location of the tracked object 305. In some embodiments, the second image data 390 may also include image data of a suspected thief of the tracked object 305 captured using the camera 370 of the one of the plurality of second A/V recording and communication devices 312, 313. In some embodiments, the location of the tracked object 305 may be determined at the backend server 330 using the source identifying data 462, which, as described above, may be used to determine the location(s) of the second A/V recording and communication device(s) 312, 313.

Figure 27:
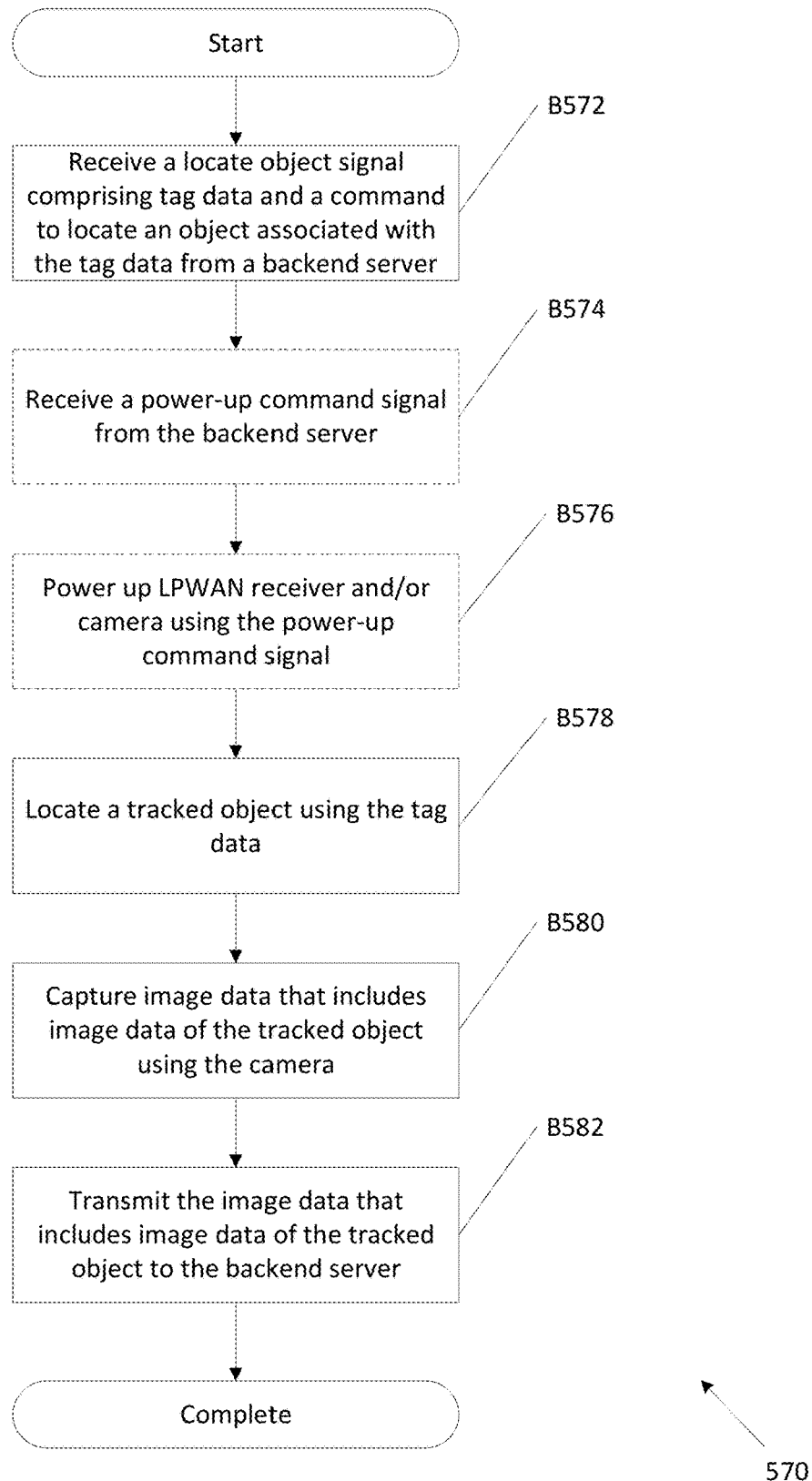
FIG. 27 is a flowchart illustrating one embodiment of a process for capturing image data of a tracked object according to an aspect of the present disclosure.

FIG. 27 is a flowchart illustrating one embodiment of a process 570 for capturing image data 390 of a tracked object according to an aspect of the present disclosure. The process 570 may include at least one second A/V recording and communication device 312, 313, receiving (block B572) a locate object signal 394 from a backend server 330, as described above. In various embodiments, the locate object signal 394 may include tag data 422 and a command to locate a tracked object 305 associated with the tag data 422, as described above. In some embodiments, the process 570 may include receiving (block B574) a power-up command signal 396 that configures a processor 382 of the second A/V recording and communication device 312, 313 to power up (block B576) the LPWAN receiver 378 and/or the camera 370 from a low-power mode to a powered-on mode, as described above. The process 570 may also include locating (block B578) a tracked object 305 using the tag data 422, as described above. Upon locating the tracked object 305, the second A/V recording and communication device(s) 312, 313 may capture (block B580) second image data 390 that includes image data of the tracked object 305 using the camera 370. As described above, the second image data 390 may also include image data of a suspected thief associated with the tracked object 305. Further, the process 570 may also include transmitting (block B582) the second image data 390 that includes the image data of the tracked object 305 (and, in some embodiments, the suspected thief) to the backend server 330.

In some of the present embodiments, including, for example, the processes 550, 570 of FIGS. 26 and 27, one aspect may comprise acquiring permissions. The plurality of second A/V recording and communication devices 312 may be owned by and/or associated with user(s) other than the user associated with the tracked object 305. Thus, one aspect of the present embodiments may comprise acquiring permissions from the owner(s)/user(s) of the second A/V recording and communication devices 312 to access videos recorded by those devices 312, and/or acquiring permissions from the owner(s)/user(s) of the second A/V recording and communication devices 312 to send to such devices 312 the locate object signal 394 and to command such devices 312 to record videos in response to receiving the locate object signal 394. In some embodiments, the second A/V recording and communication devices 313, which are public or "neighborhood" cameras, may be accessed without first acquiring permissions.

In one example embodiment, acquiring permissions from the owner(s)/user(s) of the second A/V recording and communication devices 312 may comprise requesting and obtaining blanket permissions to access any videos recorded by the devices 312 in response to the devices 312 receiving the locate object signal 394 from the backend server 330, and/or to send to such devices 312 the locate object signal 394 and to command such devices 312 to record videos in response to receiving the locate object signal 394. Such blanket permissions may be requested and obtained, for example, at the time each of the second A/V recording and communication devices 312 is first set up by their respective owners/users, where the blanket permission is requested and obtained during one or more steps in setting up the devices 312. Alternatively, the blanket permissions may be requested and obtained from the owner(s)/user(s) of the second A/V recording and communication devices 312 at any time during the operational life of such devices 312. Blanket permissions may be requested and obtained, for example, through one or more requests (e.g., push notifications) sent to the client devices 314, 316 associated with the second A/V recording and communication devices 312.

In another example embodiment, acquiring permissions from the owner(s)/user(s) of the second A/V recording and communication devices 312 may comprise requesting and obtaining limited permissions to access only specific videos recorded by the devices 312 in response to the devices 312 receiving the locate object signal 394 from the backend server 330, and/or to send to such devices 312 the locate object signal 394 and to command such devices 312 to record videos in response to receiving the locate object signal 394. Such limited permissions may be requested and obtained, for example, in response to receiving the output signal 428 from the smart-home hub device 301 (and/or the output signal 366 from the first A/V recording and communication device 302) indicating that a tracked object 305 is missing. Limited permissions may be requested and obtained, for example, through one or more requests (e.g., push notifications) sent to the client devices 314, 316 associated with the second A/V recording and communication devices 312. For example, when a tracked object 305 is reported missing through the locate object signal 394 sent to the backend server 330, requests for limited permissions may be sent to the client devices 314, 316 associated with the second A/V recording and communication devices 312, where the second A/V recording and communication devices 312 are located within a certain distance of the smart-home hub device 301 that sent the output signal 428 (and/or the first A/V recording and communication device 302 that sent the output signal 366). Such requests for limited permissions may comprise, for example, push notifications, or any other type of communication. After obtaining limited permissions from at least some of the owners/users of the second A/V recording and communication devices 312 located within the certain distance of the smart-home hub device 301 that sent the output signal 428 (and/or the first A/V recording and communication device 302 that sent the output signal 366), the backend server 330 may send the locate object signal 394 to the at least some of the second A/V recording and communication devices 312 for which the limited permissions have been obtained. Those devices 312 may subsequently record image data (e.g., videos) when the LPWAN receivers 378 of such devices 312 detect the tag 303 associated with the missing tracked object 305. The recorded image data may then be sent by the second A/V recording and communication devices 312 to the backend server 330 and shared with the first client device 304, 306, as described above.

Figure 28:
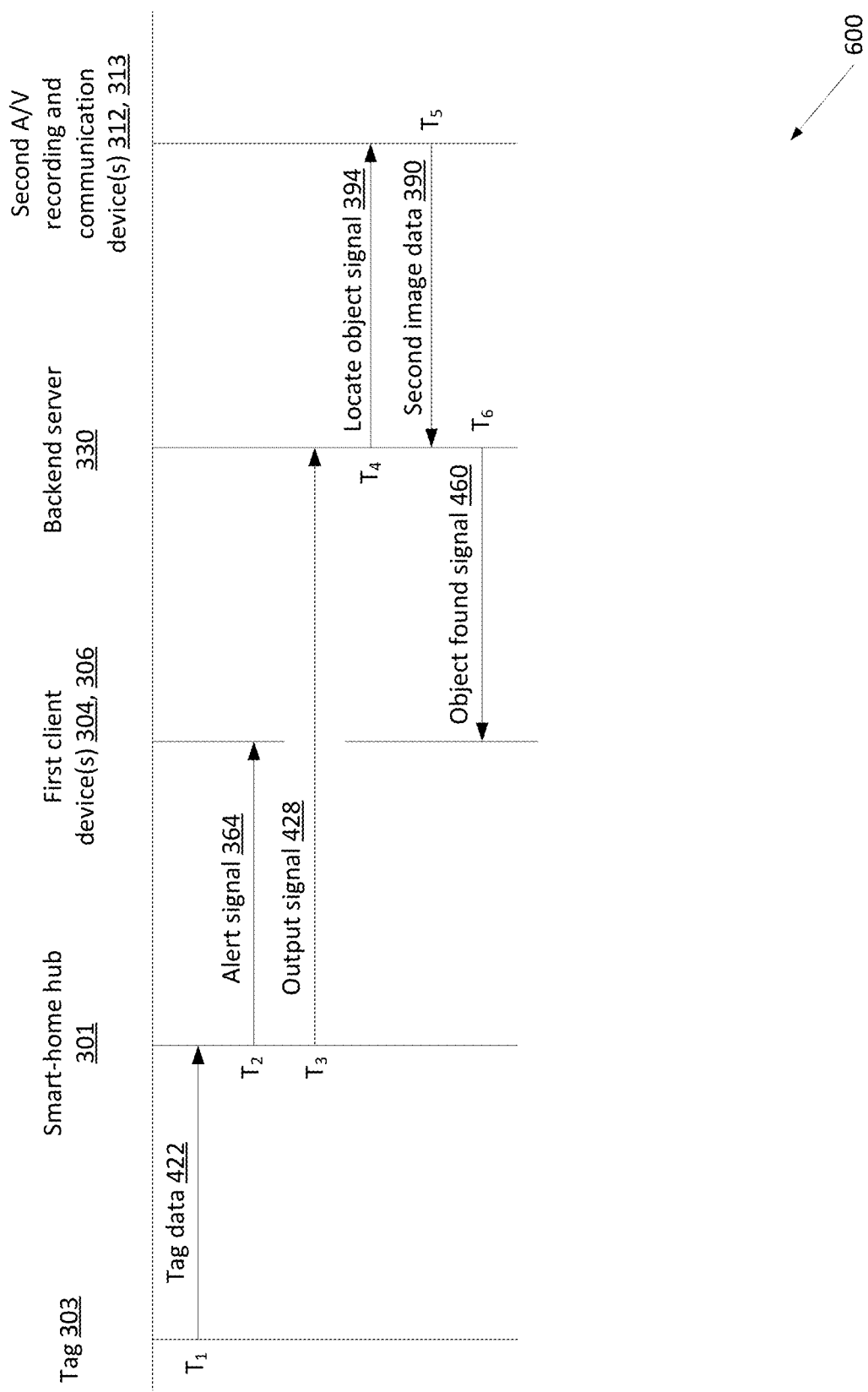
FIGS. 28-29 are sequence diagrams illustrating embodiments of processes for locating missing and/or stolen objects according to various aspects of the present disclosure.

FIG. 28 is a sequence diagram illustrating an embodiment of a process 600 for locating missing and/or stolen objects according to various aspects of the present disclosure. The process 600 may include a tag device 303, a smart-home hub device 301, a first client device(s) 304, 306, a backend device, such as a backend server 330, and a second A/V recording and communication device(s) 312, 313. At a time $T_1$, the process 600 may include the tag 303 sending tag data 422 to the smart-home hub device 301. In various embodiments, the tag data 422 may include location data 424, as described above. Further, the tag 303 may be associated with at least one tracked object 305 by the smart-home hub device 301 for monitoring about a premises, as further described above. Upon a determination that the at least one tracked object 305 has been removed from the premises, at a time $T_2$, the smart-home hub device 301 may transmit an alert signal 426 to the first client device(s) 304, 306, as described above. At a time $T_3$, the smart-home hub device 301 may transmit an output signal 428 that includes the tag data 422 and identifies at least one tracked object 305 as missing to the backend server 330, as described above. In other embodiments, the smart-home hub device 301 may transmit the output signal 428 to the backend server 330 at the same time as, or before, transmitting the alert signal 426 to the first client device(s) 304, 306. At a time $T_4$, the backend server 330 may transmit to one or more of the second A/V recording and communication device(s) 312, 313 a locate object signal 394 that includes the tag data 422 and a command to locate the tracked object 305 using the tag data 422, as described above. In many embodiments, the second A/V recording and communication device(s) 312, 313 may locate the at least one tracked object 305 using the tag data 422 and capture image data, such as the second image data 390, using a camera 370. In some embodiments, the backend server 330 may also transmit a power-up command signal 396 that configures the LPWAN receiver 378 and/or the camera 370 of the second A/V recording and communication device(s) 312, 313 to first power up and then capture the tag data 422 and the second image data 390, respectively. Upon locating the tracked object 305 and capturing the second image data 390, the second A/V recording and communication device(s) 312, 313 may transmit the second image data 390 to the backend server 330 at a time $T_5$. The backend server 330 may generate and transmit an object found signal 460 to the first client device(s) 304, 306 at a time $T_6$. In many embodiments, the object found signal 460 may include the second image data 390, where the second image data 390 may include image data of the tracked object 305 (and, in some embodiments, a suspected thief), and/or the location data 424 that includes the location of the tracked object 305, as described above.

Figure 29:
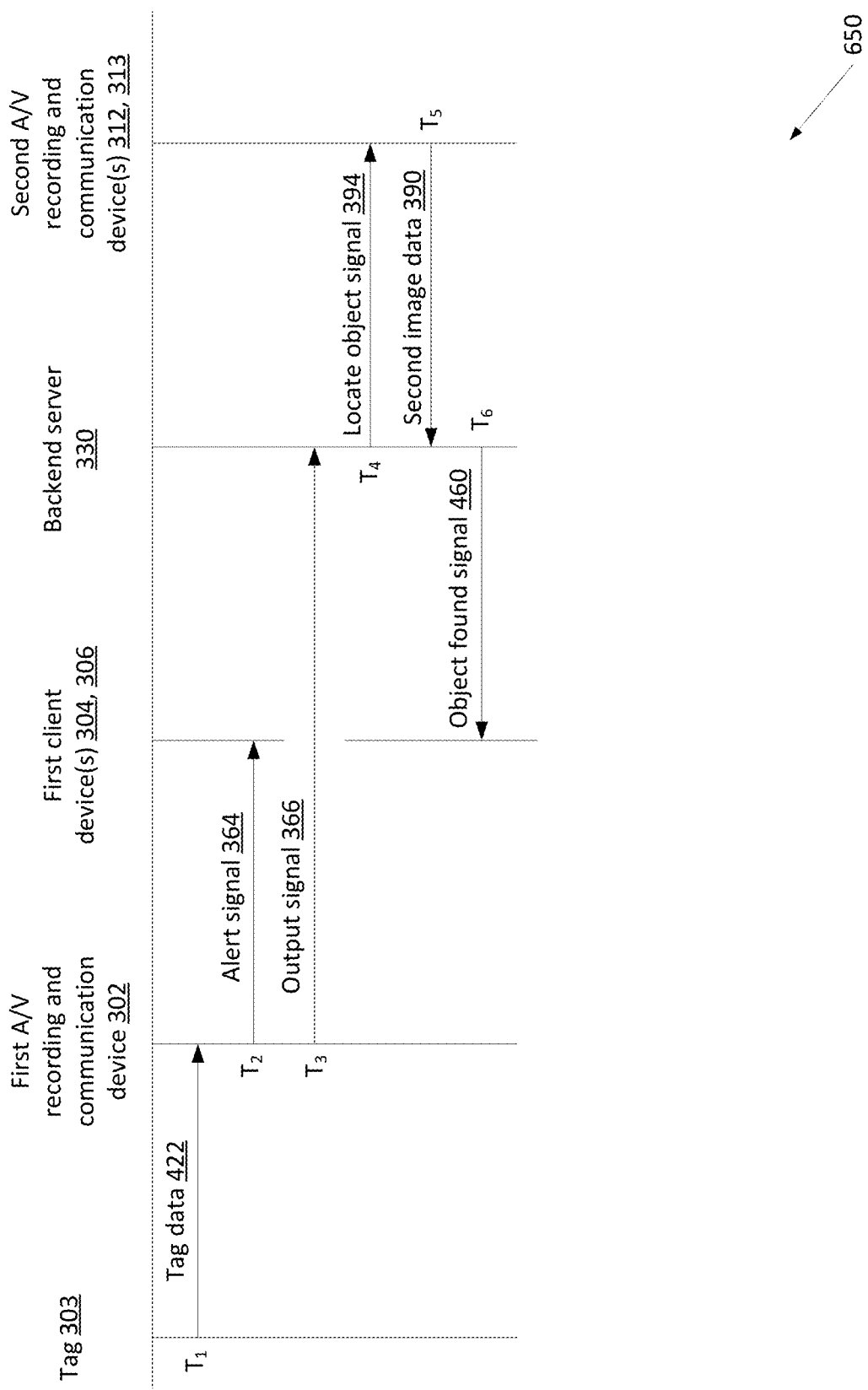

FIG. 29 is a sequence diagram illustrating another embodiment of a process 650 for locating missing and/or stolen objects according to various aspects of the present disclosure. In some embodiments, a first A/V recording and communication device 302 may monitor a tracked object 305 on a premises. The process 650 may include a tag device 303, a first A/V recording and communication device 302, a first client device(s) 304, 306, a backend device, such as a backend server 330, and a second A/V recording and communication device(s) 312, 313. At a time $T_1$, the process may include the tag 303 sending tag data 422 to the first A/V recording and communication device 302. In various embodiments, the tag data 422 may include location data 424, as described above. Further, the tag 303 may be associated with at least one tracked object 305 by the first A/V recording and communication device 302 for monitoring about a premises, as further described above. In many embodiments, the first A/V recording and communication device 302 may determine when the at least one tracked object 305 has been removed from the premises using similar processes used by a smart-home hub device 301, as described above. Upon a determination that the at least one tracked object 305 has been removed from the premises, at a time $T_2$, the first A/V recording and communication device 302 may transmit an alert signal 364 to the first client device(s) 304, 306 associated with the first A/V recording and communication device 302, as described above. At a time $T_3$, the first A/V recording and communication device 302 may transmit an output signal 366 that includes the tag data 422 and identifies the at least one tracked object 305 as missing to the backend server 330, as described above. In other embodiments, the first A/V recording and communication device 302 may transmit the output signal 366 to the backend server 330 at the same time as, or before, transmitting the alert signal 364 to the first client device(s) 304, 306. At a time $T_4$, the backend server 330 may transmit to one or more of the second A/V recording and communication device(s) 312, 313 a locate object signal 394 that includes the tag data 422 and a command to locate the tracked object 305 using the tag data 422, as described above. In many embodiments, the second A/V recording and communication device(s) 312, 313 may locate the at least one tracked object 305 using the tag data 422 and capture second image data 390 using a camera 370. In some embodiments, the backend server 330 may also transmit a power-up command signal 396 that configures the LPWAN receiver 378 and/or the camera 370 of the second A/V recording and communication device(s) 312, 313 to first power up and then capture the tag data 422 and the second image data 390, respectively. Upon locating the tracked object 305 and capturing the second image data 390, the second A/V recording and communication device(s) 312, 313 may transmit the second image data 390 to the backend server 330 at a time $T_5$. The backend server 330 may generate and transmit an object found signal 460 to the first client device(s) 304, 306 at a time $T_6$. In many embodiments, the object found signal 460 may include the second image data 390, where the second image data 390 may include image data of the tracked object 305 (and, in some embodiments, a suspected thief), and/or the location data 424 that includes the location of the tracked object 305, as described above.

Figure 30:
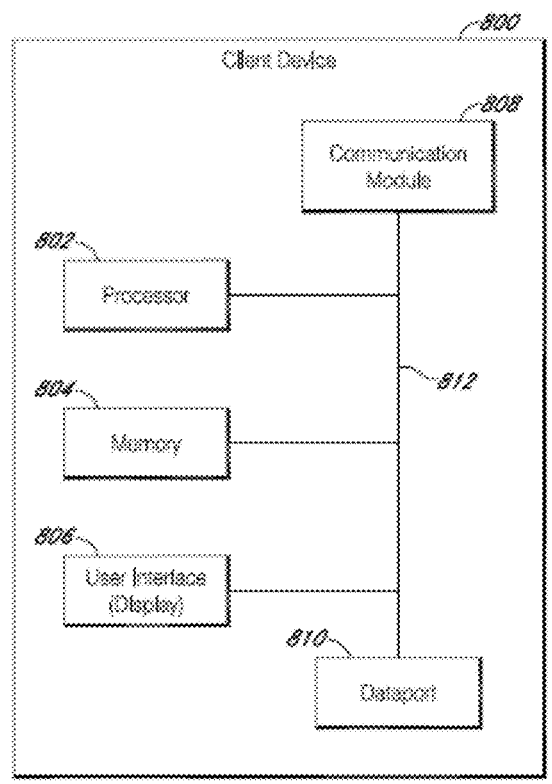
FIG. 30 is a functional block diagram of a client device on which the present embodiments may be implemented according to various aspects of the present disclosure.

FIG. 30 is a functional block diagram of a client device 800 on which the present embodiments may be implemented according to various aspects of the present disclosure. The user's client device 114 described with reference to FIG. 1 may include some or all of the components and/or functionality of the client device 800. The client device 800 may comprise, for example, a smartphone.

With reference to FIG. 30, the client device 800 includes a processor 802, a memory 804, a user interface 806, a communication module 808, and a dataport 810. These components are communicatively coupled together by an interconnect bus 812. The processor 802 may include any processor used in smartphones and/or portable computing devices, such as an ARM processor (a processor based on the RISC (reduced instruction set computer) architecture developed by Advanced RISC Machines (ARM).). In some embodiments, the processor 802 may include one or more other processors, such as one or more conventional microprocessors, and/or one or more supplementary co-processors, such as math co-processors.

The memory 804 may include both operating memory, such as random access memory (RAM), as well as data storage, such as read-only memory (ROM), hard drives, flash memory, or any other suitable memory/storage element. The memory 804 may include removable memory elements, such as a CompactFlash card, a MultiMediaCard (MMC), and/or a Secure Digital (SD) card. In some embodiments, the memory 804 may comprise a combination of magnetic, optical, and/or semiconductor memory, and may include, for example, RAM, ROM, flash drive, and/or a hard disk or drive. The processor 802 and the memory 804 each may be, for example, located entirely within a single device, or may be connected to each other by a communication medium, such as a USB port, a serial port cable, a coaxial cable, an Ethernet-type cable, a telephone line, a radio frequency transceiver, or other similar wireless or wired medium or combination of the foregoing. For example, the processor 802 may be connected to the memory 804 via the dataport 810.

The user interface 806 may include any user interface or presentation elements suitable for a smartphone and/or a portable computing device, such as a keypad, a display screen, a touchscreen, a microphone, and a speaker. The communication module 808 is configured to handle communication links between the client device 800 and other, external devices or receivers, and to route incoming/outgoing data appropriately. For example, inbound data from the dataport 810 may be routed through the communication module 808 before being directed to the processor 802, and outbound data from the processor 802 may be routed through the communication module 808 before being directed to the dataport 810. The communication module 808 may include one or more transceiver modules capable of transmitting and receiving data, and using, for example, one or more protocols and/or technologies, such as GSM, UMTS (3GSM), IS-95 (CDMA one), IS-2000 (CDMA 2000), LTE, FDMA, TDMA, W-CDMA, CDMA, OFDMA, Wi-Fi, WiMAX, or any other protocol and/or technology.

The dataport 810 may be any type of connector used for physically interfacing with a smartphone and/or a portable computing device, such as a mini-USB port or an IPHONE®/IPOD® 30-pin connector or LIGHTNING® connector. In other embodiments, the dataport 810 may include multiple communication channels for simultaneous communication with, for example, other processors, servers, and/or client terminals.

The memory 804 may store instructions for communicating with other systems, such as a computer. The memory 804 may store, for example, a program (e.g., computer program code) adapted to direct the processor 802 in accordance with the present embodiments. The instructions also may include program elements, such as an operating system. While execution of sequences of instructions in the program causes the processor 802 to perform the process steps described herein, hard-wired circuitry may be used in place of, or in combination with, software/firmware instructions for implementation of the processes of the present embodiments. Thus, the present embodiments are not limited to any specific combination of hardware and software.

Figure 31:
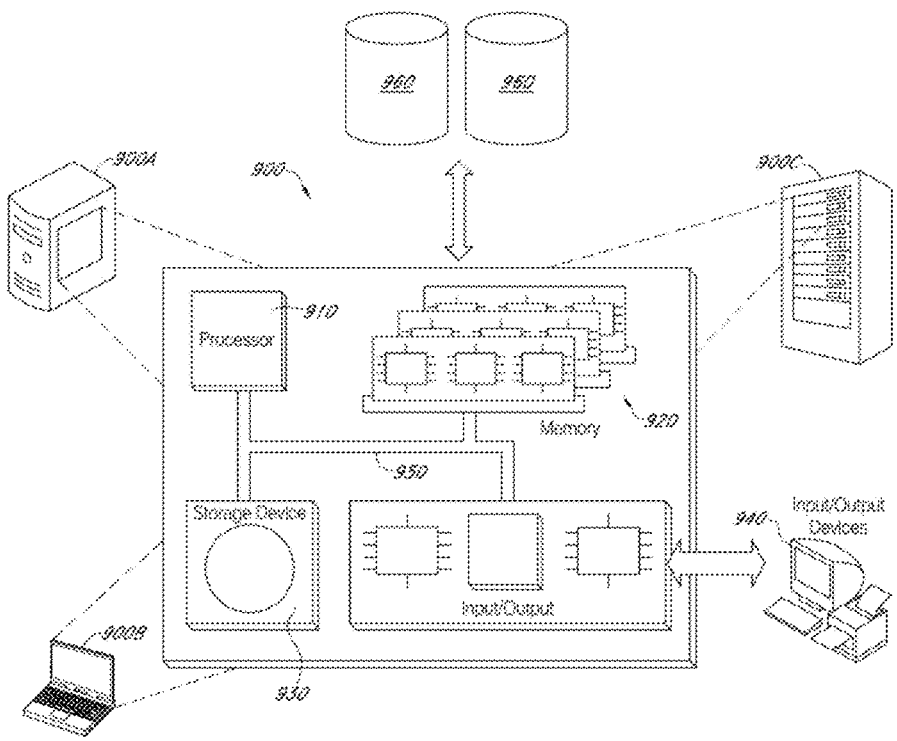
FIG. 31 is a functional block diagram of a general-purpose computing system on which the present embodiments may be implemented according to various aspects of present disclosure.

FIG. 31 is a functional block diagram of a general-purpose computing system on which the present embodiments may be implemented according to various aspects of the present disclosure. The computer system 900 may be embodied in at least one of a personal computer (also referred to as a desktop computer) 900A, a portable computer (also referred to as a laptop or notebook computer) 900B, and/or a server 900C. A server is a computer program and/or a machine that waits for requests from other machines or software (clients) and responds to them. A server typically processes data. The purpose of a server is to share data and/or hardware and/or software resources among clients. This architecture is called the client-server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes.

The computer system 900 may execute at least some of the operations described above. The computer system 900 may include at least one processor 910, memory 920, at least one storage device 930, and input/output (I/O) devices 940. Some or all of the components 910, 920, 930, 940 may be interconnected via a system bus 950. The processor 910 may be single- or multi-threaded and may have one or more cores. The processor 910 may execute instructions, such as those stored in the memory 920 and/or in the storage device 930. Information may be received and output using one or more I/O devices 940.

The memory 920 may store information, and may be a computer-readable medium, such as volatile or non-volatile memory. The storage device(s) 930 may provide storage for the system 900, and may be a computer-readable medium. In various aspects, the storage device(s) 930 may be a flash memory device, a hard disk device, an optical disk device, a tape device, or any other type of storage device.

The I/O devices 940 may provide input/output operations for the system 900. The I/O devices 940 may include a keyboard, a pointing device, and/or a microphone. The I/O devices 940 may further include a display unit for displaying graphical user interfaces, a speaker, and/or a printer. External data may be stored in one or more accessible external databases 960.

The features of the present embodiments described herein may be implemented in digital electronic circuitry, and/or in computer hardware, firmware, software, and/or in combinations thereof. Features of the present embodiments may be implemented in a computer program product tangibly embodied in an information carrier, such as a machine-readable storage device, and/or in a propagated signal, for execution by a programmable processor. Embodiments of the present method steps may be performed by a programmable processor executing a program of instructions to perform functions of the described implementations by operating on input data and generating output.

The features of the present embodiments described herein may be implemented in one or more computer programs that are executable on a programmable system including at least one programmable processor coupled to receive data and/or instructions from, and to transmit data and/or instructions to, a data storage system, at least one input device, and at least one output device. A computer program may include a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions may include, for example, both general and special purpose processors, and/or the sole processor or one of multiple processors of any kind of computer. Generally, a processor may receive instructions and/or data from a read only memory (ROM), or a random access memory (RAM), or both. Such a computer may include a processor for executing instructions and one or more memories for storing instructions and/or data.

Generally, a computer may also include, or be operatively coupled to communicate with, one or more mass storage devices for storing data files. Such devices include magnetic disks, such as internal hard disks and/or removable disks, magneto-optical disks, and/or optical disks. Storage devices suitable for tangibly embodying computer program instructions and/or data may include all forms of non-volatile memory, including for example semiconductor memory devices, such as EPROM, EEPROM, and flash memory devices, magnetic disks such as internal hard disks and removable disks, magneto-optical disks, and CD-ROM and DVD-ROM disks. The processor and the memory may be supplemented by, or incorporated in, one or more ASICs (application-specific integrated circuits).

To provide for interaction with a user, the features of the present embodiments may be implemented on a computer having a display device, such as an LCD (liquid crystal display) monitor, for displaying information to the user. The computer may further include a keyboard, a pointing device, such as a mouse or a trackball, and/or a touchscreen by which the user may provide input to the computer.

The features of the present embodiments may be implemented in a computer system that includes a back-end component, such as a data server, and/or that includes a middleware component, such as an application server or an Internet server, and/or that includes a front-end component, such as a client computer having a graphical user interface (GUI) and/or an Internet browser, or any combination of these. The components of the system may be connected by any form or medium of digital data communication, such as a communication network. Examples of communication networks may include, for example, a LAN (local area network), a WAN (wide area network), and/or the computers and networks forming the Internet.

The computer system may include clients and servers. A client and server may be remote from each other and interact through a network, such as those described herein. The relationship of client and server may arise by virtue of computer programs running on the respective computers and having a client-server relationship to each other.

The above description presents the best mode contemplated for carrying out the present embodiments, and of the manner and process of practicing them, in such full, clear, concise, and exact terms as to enable any person skilled in the art to which they pertain to practice these embodiments. The present embodiments are, however, susceptible to modifications and alternate constructions from those discussed above that are fully equivalent. Consequently, the present invention is not limited to the particular embodiments disclosed. On the contrary, the present invention covers all modifications and alternate constructions coming within the spirit and scope of the present disclosure. For example, the steps in the processes described herein need not be performed in the same order as they have been presented, and may be performed in any order(s). Further, steps that have been presented as being performed separately may in alternative embodiments be performed concurrently. Likewise, steps that have been presented as being performed concurrently may in alternative embodiments be performed separately.

What is claimed is:

1. A method for monitoring an object using a smart-home hub device in network communication with audio/video (A/V) recording and communication devices, the method comprising:
    associating, by the smart-home hub device, a tag having tag data compatible for use in a low-power wide-area network (LPWAN) with at least one tracked object, wherein the tag is configured to transmit the tag data over a frequency compatible with the LPWAN using a communication module;
    powering up the smart-home hub device to monitor the at least one tracked object on a premises by in response to a locate object signal and listening for the tag data transmitted by the tag, wherein the smart-home hub device listens for the tag data using an LPWAN receiver configured to receive the tag data, and wherein the locate object signal comprises an instruction to power up the communication module that configures the communication module to listen for the tag data transmitted by the tag;
    determining that the at least one tracked object has been removed from the premises using the tag data; and
    transmitting, from the smart-home hub device, to a first client device associated with a first A/V recording and communication device, an alert upon a determination that the at least one tracked object has been removed from the premises.

2. The method of claim 1, further comprising receiving the tag data, from the tag, at the smart-home hub device, wherein the tag data includes location data.

3. The method of claim 1, further comprising receiving the tag data, from the tag, at the smart-home hub device, wherein the tag data includes location data, and the location data indicates that the tag is moving away from the smart-home hub device.

4. The method of claim 1, wherein the tag is configured to transmit the tag data using chirp spread spectrum (CSS) modulation techniques.

5. The method of claim 4, wherein the smart-home hub device comprises a communication module configured to receive the tag data using CSS demodulation techniques.

6. The method of claim 5, wherein the tag data is LoRa data.

7. The method of claim 6, wherein the tag is a LoRa tracker configured to transmit the LoRa data.

8. The method of claim 7, wherein the smart-home hub device comprises a communication module configured to receive LoRa data.

9. The method of claim 1, wherein the tag is configured to transmit the tag data using ultra narrowband (UNB) modulation techniques.

10. The method of claim 9, wherein the smart-home hub device comprises a communication module configured to receive the tag data using UNB demodulation techniques.

11. The method of claim 1, further comprising transmitting, from the smart-home hub device, to a backend server, an output signal that includes the tag data and identifies the at least one tracked object as missing.

12. A method for monitoring an object using audio/video recording and communication devices (A/V devices), the method comprising:
    receiving, from a smart-home hub device associated with a first user, at a server, an output signal that includes tag data compatible for use in a low-power wide-area network (LPWAN), wherein the output signal identifies at least one tracked object as missing;
    transmitting, from the server, to a plurality of A/V devices each having a communication module configured to receive the tag data over a frequency compatible with the LPWAN and each being associated with one or more users other than the first user, a locate object signal that comprises:
        the tag data, and
        an instruction to power up the communication module from a low-power mode to a powered-on mode, wherein the instruction to power up the communication module configures the communication module to listen for the tag data transmitted by a tag;
    receiving, from one of the plurality of A/V devices, image data of the at least one tracked object captured using a camera of the one of the plurality of A/V devices; and
    transmitting, from the server to a client device associated with the smart-home hub device, an object found signal comprising the image data of the at least one tracked object.

13. The method of claim 12, wherein the locate object signal further comprises an instruction to power up the camera and capture the image data of the at least one tracked object.

14. The method of claim 13, wherein the image data includes images of a person who has removed the at least one tracked object from a premises.

15. The method of claim 12, wherein the communication module is further configured to receive the tag data using chirp spread spectrum (CSS) demodulation techniques.

16. The method of claim 15, wherein the tag data is LoRa data.

17. The method of claim 16, wherein the communication module is further configured to receive LoRa data.

18. The method of claim 12, wherein the communication module is further configured to receive tag data using ultra narrowband (UNB) demodulation techniques.

19. A method for locating a missing object using an audio/video recording and communication device (A/V device), the A/V device including a camera and a communication module, the method comprising:
    receiving, from a server, using the communication module, a locate object signal comprising tag data compatible for use in a low-power wide-area network (LPWAN) and an instruction to power up the communication module of the A/V device from a low-power mode to a powered-on mode, wherein the instruction to power up the communication module configures the communication module to listen for the tag data transmitted by a tau;
    powering up the communication module based on the receiving of the locate object signal, wherein the communication module comprises an LPWAN receiver configured to receive the tag data;
    listening for, and detecting, using the communication module, the tag data transmitted by the tag over a frequency compatible with the LPWAN;
    recording, using the camera, image data that includes image data of the tracked object; and
    transmitting, to the server, an object found signal comprising the image data that includes the image data of the tracked object.

20. The method of claim 19, wherein the power-up command signal further configures the A/V device to power up the camera and capture the image data that includes the image data of the tracked object.

21. The method of claim 20, wherein the image data includes images of a person who has removed the tracked object from a premises.

22. The method of claim 19, wherein:
    the listening for, and detecting, the tag data occurs in response to receiving the locate object signal; and
    the recording, using the camera, image data that includes image data of the tracked object occurs in response to detecting the tag data.

23. The method of claim 1, wherein the determining that the at least one tracked object has been removed from the premises using the tag data comprises determining that the tag data transmitted by the tag is not received by the smart-home hub device within a user-specified predetermined time-out period.

24. The method of claim 1, wherein the determining that the at least one tracked object has been removed from the premises using the tag data comprises determining that the tag data transmitted by the tag is not received by the smart-home hub device within an item specific predetermined time-out period.

* * * * *

UNITED STATES PATENT AND TRADEMARK OFFICE
CERTIFICATE OF CORRECTION

PATENT NO. : 11,381,784 B1
APPLICATION NO. : 16/114422
DATED : July 5, 2022
INVENTOR(S) : James Siminoff et al.

It is certified that error appears in the above-identified patent and that said Letters Patent is hereby corrected as shown below:

In the Claims

Column 36, Line 25, change "AN" to -- A/V --.

Column 38, Line 16, change "tau" to -- tag --.

Signed and Sealed this
Twentieth Day of September, 2022

Katherine Kelly Vidal
*Director of the United States Patent and Trademark Office*